US012782110B2

(12) United States Patent
Kim et al.

(10) Patent No.: US 12,782,110 B2
(45) Date of Patent: Nov. 3, 2026

(54) SEMICONDUCTOR MEASURING DEVICE USING BEAM DISPLACER

(71) Applicant: Samsung Electronics Co., Ltd., Suwon-si (KR)

(72) Inventors: Hyungjin Kim, Suwon-si (KR); Hojun Lee, Suwon-si (KR); Daehoon Han, Suwon-si (KR); Jangwoon Sung, Suwon-si (KR); Jongsu Kim, Suwon-si (KR); Narae Bae, Suwon-si (KR); Sangwoo Bae, Suwon-si (KR); Minhwan Seo, Suwon-si (KR); Kyungjun Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/024,414

(22) Filed: Jan. 16, 2025

(65) Prior Publication Data

US 2025/0334393 A1 Oct. 30, 2025

(30) Foreign Application Priority Data

Apr. 29, 2024 (KR) ........................ 10-2024-0057085

(51) Int. Cl.
*G01B 9/02* (2022.01)
*G01B 9/02001* (2022.01)
*G01B 11/06* (2006.01)

(52) U.S. Cl.
CPC ..... *G01B 9/02087* (2013.01); *G01B 9/02007* (2013.01); *G01B 9/02011* (2013.01);
(Continued)

(58) Field of Classification Search
CPC ............ G01B 9/02087; G01B 9/02007; G01B 9/02011; G01B 9/02084; G01B 11/0608; G01B 2290/70; G01B 11/2441; G01B 2210/56; G02B 21/361; G02B 21/365; G02B 27/283; H10P 74/203
(Continued)

(56) References Cited

U.S. PATENT DOCUMENTS 7,978,336 B2 7/2011 Mann et al.
9,310,560 B2 4/2016 Chann et al.
(Continued)

*Primary Examiner* — Md M Rahman

(74) *Attorney, Agent, or Firm* — Wolf, Greenfield & Sacks, P.C.

(57) ABSTRACT

A semiconductor measuring device includes a first light source configured to output first light having a first wavelength, a second light source configured to output second light having a second wavelength, different from the first wavelength, a first beam splitter configured to generate first combined light and second combined light, each comprising the first light and the second light, a beam displacer configured to separate the first combined light into the first light and the second light, a camera configured to obtain a first interference pattern and a second interference pattern, the first interference pattern being based on the first light and a reflected light of the second combined light reflected from a first surface of a measurement object, and a computing device configured to compute first height information of a first point included in the first surface based on the first interference pattern and the second interference pattern.

19 Claims, 21 Drawing Sheets

(52) U.S. Cl.
CPC ...... *G01B 9/02084* (2013.01); *G01B 11/0608* (2013.01); *G01B 2290/70* (2013.01)

(58) Field of Classification Search
USPC .......................................................... 356/496
See application file for complete search history.

(56) References Cited

U.S. PATENT DOCUMENTS

| | | | | |
|---|---|---|---|---|
| 10,488,175 | B2 | 11/2019 | Shaked et al. | |
| 10,510,624 | B2 | 12/2019 | Vaez-Iravani et al. | |
| 11,340,438 | B2 | 5/2022 | Cuche et al. | |
| 11,519,935 | B2 | 12/2022 | Labuda et al. | |
| 2017/0261738 | A1* | 9/2017 | Shiono | G02B 21/0056 |
| 2023/0000343 | A1 | 1/2023 | Kim et al. | |
| 2023/0184535 | A1 | 6/2023 | Lee et al. | |
| 2023/0400404 | A1 | 12/2023 | Choi et al. | |

* cited by examiner

SEMICONDUCTOR MEASURING DEVICE USING BEAM DISPLACER

CROSS-REFERENCE TO RELATED APPLICATION(S)

This U.S. non-provisional application claims priority under 35 USC § 119 to Korean Patent Application No. 10-2024-0057085, filed on Apr. 29, 2024, in the Korean Intellectual Property Office, the disclosure of which is herein incorporated by reference in its entirety.

FIELD

Example embodiments relate to a semiconductor measuring device using a beam displacer.

BACKGROUND

In a semiconductor manufacturing process, semiconductor measuring devices may be used to irradiate light onto a surface of a manufactured semiconductor wafer and measure semiconductor characteristics based on light reflected from the surface of the semiconductor wafer.

For example, a semiconductor measuring device may measure height information of a measurement object (for example, a semiconductor wafer) using an interference pattern between light reflected from the measurement object and incident light with an inclined wavefront.

When a semiconductor measuring device measures height information using light having a single wavelength, a measurement range of the height information may be limited due to phase ambiguity.

Accordingly, methods of increasing a measurable range of height information using light corresponding to a plurality of different wavelengths are being used.

When lights having different wavelengths sequentially output from a single light source are transmitted through a single optical path, the time required to measure height information may increase. In addition, as the time required to measure height information increases, the accuracy of measurement results may be reduced due to vibration that occurs in a measurement object.

When a plurality of light sources output lights having different wavelengths separate optical paths may be required for each respective light.

When the separate optical paths are formed, a size of the semiconductor measuring device may increase and complexity of the configuration may increase.

In addition, due to spatial constraints within the semiconductor measuring device, the range of wavelengths used to measure the height information of the measurement object may be limited.

In addition, as the lights having different wavelengths travel along different optical paths, the accuracy of the measurement results may be reduced due to vibration that occurs in the measurement object.

SUMMARY

Example embodiments provide a semiconductor for improving the accuracy and stability of measurement using a beam displacer that separates a plurality of lights having different optical characteristics.

According to an example embodiment, a semiconductor measuring device includes a first light source configured to output first light having a first wavelength, a second light source configured to output second light having a second wavelength, different from the first wavelength, a first beam splitter configured to generate first combined light and second combined light, each including the first light and the second light, a beam displacer configured to separate the first combined light into the first light and the second light, a camera configured to obtain a first interference pattern and a second interference pattern, the first interference pattern being based on the first light and a reflected light of the second combined light reflected from a first surface of a measurement object and a second interference pattern being based on the second light and the reflected light, and a computing device configured to compute first height information of a first point included in the first surface based on the first interference pattern and the second interference pattern.

According to an example embodiment, a semiconductor measuring device includes a first light source configured to output first light having a first polarization component, a second light source configured to output second light having a second polarization component, which is different from the first polarization component, a first beam splitter configured to output a first combined light and a second combined light, each including the first light and the second light, a beam displacer configured to receive the first combined light and separate the first combined light into the first light and the second light, a camera configured to obtain a first interference pattern and a second interference pattern, the first interference pattern being based on the first light and a reflected light of the second combined light reflected from a first surface of a measurement object, and the second interference pattern being based on the second light and the reflected light, and a computing device configured to compute first height information of a first point included in the first surface based on the first interference pattern and the second interference pattern.

According to an example embodiment, a semiconductor measuring device includes a first light source configured to output first light having a first optical characteristic, a second light source configured to output second light having a second optical characteristic, a first beam splitter configured to generate the first combined light and the second combined light, each including the first light and second light, a beam displacer configured to receive the first combined light and separate the first combined light into the first light and the second light based on the first optical characteristic and the second optical characteristic, a camera configured to obtain a first interference pattern and a second interference pattern, the first interference pattern being based on the first light and a reflected light of the second combined light reflected from a first surface of a measurement object, and the second interference pattern being based on the second light and the reflected light, and a computing device configured to compute first height information of a first point included in the first surface based on the first interference pattern and the second interference pattern.

DETAILED DESCRIPTION

Figure 1A:
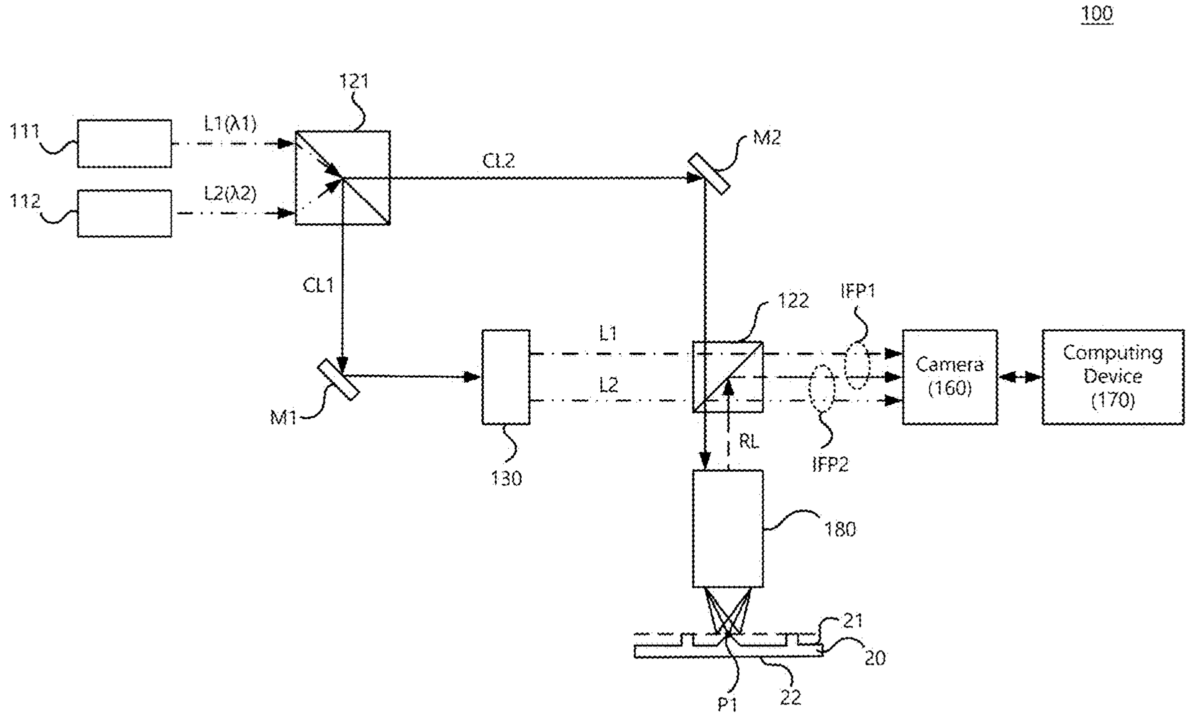
FIG. 1A is a diagram illustrating a configuration of a semiconductor measuring device according to an example embodiment.

Hereinafter, example embodiments will be described with reference to the accompanying drawings.

The terms, such as "first," "second," or the like, may represent various elements regardless of order and/or importance. Such terms may only be used to distinguish one element from another element, and do not limit the order and/or importance of the elements. The terms "comprises," "comprising," "includes" and/or "including," when used herein, specify the presence of stated elements, but do not preclude the presence of additional elements. The term "and/or" includes any and all combinations of one or more of the associated listed items.

It will be understood that spatially relative terms such as 'on,' 'upper,' 'upper portion,' 'upper surface,' 'below,' 'between,' 'lower,' 'lower portion,' 'lower surface,' 'side surface,' and the like may be denoted by reference numerals and refer to the drawings, except where otherwise indicated. It will be understood that such spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations), and the spatially relative descriptors used herein may be interpreted accordingly.

Figure 1B:
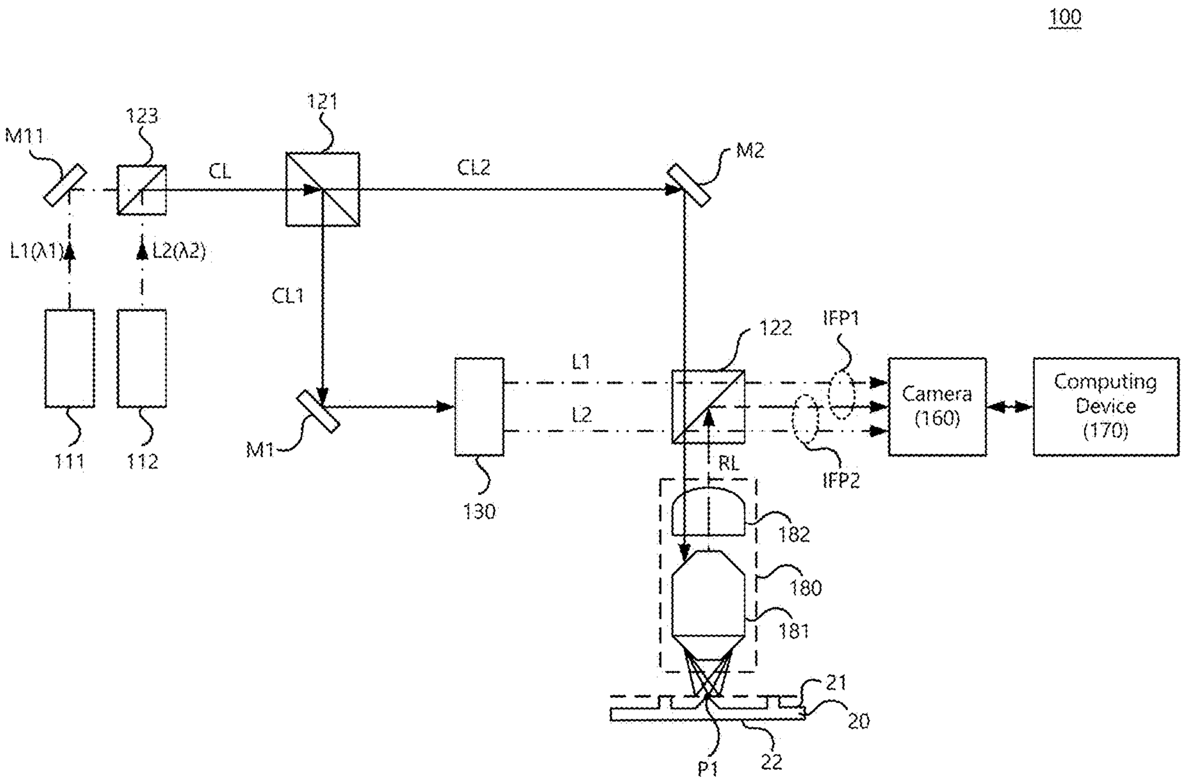
FIG. 1B is a diagram illustrating the semiconductor measuring device of FIG. 1A, which further includes a first optical mirror and a coupling device.

FIG. 1A is a diagram illustrating a configuration of a semiconductor measuring device according to an example embodiment. FIG. 1B is a diagram illustrating the semiconductor measuring device of FIG. 1A, which further includes a first optical mirror and a coupling device.

Referring to FIG. 1A, a semiconductor measuring device 100 according to an example embodiment may include a first light source 111, a second light source 112, a first beam splitter 121, a beam displacer 130, a second beam splitter 122, and a camera 160.

The semiconductor measuring device 100 according to an example embodiment may further include a computing device 170 connected to the camera 160. According to an example embodiment, the computing device 170 may be formed or otherwise provided outside or external to the semiconductor measuring device 100 to be connected to the camera 160 in a wireless or wired manner.

The semiconductor measuring device 100 may include a first light source 111 outputting first light L1. For example, the first light source 111 may output first light L1 having a first wavelength λ1.

In addition, the semiconductor measuring device 100 may include a second light source 112 outputting second light L2. For example, the second light source 112 may output second light L2 having a second wavelength λ2, different from the first wavelength λ1.

Accordingly, each of the first light source 111 and the second light source 112 may be referred to as a single-wavelength laser device outputting a single-wavelength beam (or monochromatic light).

However, the configuration of each of the first light source 111 and the second light source 112 and optical characteristics of the first and second lights L1 and L2, respectively output by the first light source 111 and the second light source 112, are not limited to the above-described example.

According to an example embodiment, the first light source 111 and the second light source 112 may output a first light L1 and a second light L2 having different optical characteristics.

For example, the first light source 111 may output a first light L1 having a first polarization component. In addition, the second light source 112 may output a second light L2 having a second polarization component, different from the first polarization component.

For example, the first light source 111 may output a first light L1 having a first coherence length. In addition, the second light source 112 may output a second light L2 having a second coherence length, different from the first coherence length.

For example, it may be understood that the first light source 111 and the second light source 112 output a first light L1 and a second light L2 having optically distinct characteristics.

Accordingly, the semiconductor measuring device 100 may include a plurality of light sources 111 and 112, respectively outputting the light L1 and L2 having different optical characteristics.

In addition, the semiconductor measuring device 100 may include a first beam splitter 121 generating a first combined light CL1 and a second combined light CL2 using the first light L1 and the second light L2.

For example, the first beam splitter 121 may generate a first combined light CL1 and a second combined light CL2, respectively including the first light L1 and the second light L2.

In addition, the first beam splitter 121 may separate the first combined light CL1 and the second combined light CL2, respectively including the first light L1 and the second light L2, to propagate in different directions.

Referring to FIG. 1B, the semiconductor measuring device 100 according to an example embodiment may further include a first optical mirror M11 and a combiner 123.

According to an example embodiment, the combiner 123 may output a combined light CL in which the first light L1 and the second light L2 are combined with each other.

For example, the combiner 123 may combine the first light L1, reflected by the first optical mirror M11, and the second light L2, output from the second light source 112, to output a combined light CL.

The first beam splitter 121 may split the combined light CL into the first combined light CL1 and the second combined light CL2.

For example, the first beam splitter 121 may split the combined light CL into the first combined light CL1 and the second combined light CL2, respectively including the first light L1 and the second light L2 and propagating in different directions.

According to an example embodiment, the first beam splitter 121 may refract the combined light CL (or the first light L1 and the second light L2) such that the first combined light CL1 propagates towards the first mirror M1.

According to an example embodiment, the first beam splitter 121 may refract the combined light CL (or the first light L1 and the second light L2) such that the first combined light CL1 propagates towards the beam displacer 130. Among components of the semiconductor measuring device 100, the first mirror M1 may be omitted.

In addition, the first beam splitter 121 may transmit the combined light CL (or the first light L1 and the second light L2) such that the second combined light CL2 propagates towards the second mirror M2.

According to an example embodiment, the first beam splitter 121 may refract the combined light CL (or the first light L1 and the second light L2) such that the second combined light CL2 propagates towards a measurement object 20 (or a microscope 180). Among the components of the semiconductor measuring device 100, the second mirror M2 may be omitted.

For example, the first combined light CL1 and the second combined light CL2 may be understood as polychromatic lights, respectively including a first wavelength (21) component of the first light L1 and a second wavelength (22) component of the second light L2.

In addition, the first combined light CL1 and the second combined light CL2 may propagate through different optical paths.

For example, the first combined light CL1 may propagate through a first optical path from the first beam splitter 121 to the beam displacer 130. Additionally, the second combined light CL2 may propagate through a second optical path from the first beam splitter 121 to the measurement object 20 (or the microscope 180).

In addition, the semiconductor measuring device 100 may include a beam displacer 130 separating the first combined light CL1 into the first light L1 and the second light L2.

For example, the beam displacer 130 may separate the first combined light CL1 into component beams including the first light L1 and the second light L2 based on optical characteristics of the first light L1 and the second light L2.

For example, the beam displacer 130 may separate the first combined light CL1 into the first light L1 and the second light L2 based on the first wavelength λ1 of the first light L1 and the second wavelength λ2 of the second light L2.

The beam displacer 130 may separate the first light L1 and the second light L2 such that the separated first and second lights L1 and L2 propagate in different directions.

According to an example embodiment, the semiconductor measuring device 100 may include a microscope 180 obtaining a reflected light RL reflected from the measurement object 20.

Referring to FIG. 1B, a microscope 180 according to an example embodiment may include an objective lens 181 focusing the second combined light CL2 onto a first surface 21 of the measurement object 20. Additionally, the microscope 180 may include a tube lens 182 focusing the reflected light RL onto the second beam splitter 122.

The semiconductor measuring device 100 may further include a second beam splitter 122 reflecting or transmitting at least a portion of the reflected light RL obtained through the microscope 180, the first light L1, and the second light L2.

According to an example embodiment, the reflected light RL may be reflected by the second beam splitter 122 and enter the camera 160. For example, the reflected light RL may pass through the second beam splitter 122 and enter the camera 160 in a direction perpendicular to a surface of the camera 160.

The first light L1 and the second light L2, separated by the beam displacer 130, may enter the camera 160 through the second beam splitter 122.

For example, the first light L1 and the second light L2 may pass through the second beam splitter 122 and enter the camera 160 at different angles with respect to a surface of the camera 160.

Furthermore, the semiconductor measuring device 100 may include a camera 160 obtaining an interference pattern between the reflected light RL and the first light L1 or the second light L2.

According to an example embodiment, the camera 160 may obtain a first interference pattern IFP1 between the first light L1 and the reflected light RL.

For example, the camera 160 may obtain a first interference pattern IFP1 between the first light L1 and the reflected light RL entering the camera 160 at different angles with respect to a surface of the camera 160.

The camera 160 may obtain a second interference pattern IFP2 between the second light L2 and the reflected light RL.

For example, the camera 160 may obtain a second interference pattern IFP2 between the second light L2 and the reflected light RL entering the camera 160 at different angles with respect to a surface of the camera 160.

Furthermore, the semiconductor measuring device 100 may include a computing device 170 computing height information of the measurement object 20. For example, the computing device 170 may be understood as a computer, but example embodiments are not limited thereto.

For example, the computing device 170 may compute height information of the measurement object 20 based on the first interference pattern IFP1 and the second interference pattern IFP2 obtained through the camera 160.

For example, the computing device 170 may compute height information of a first point P1 on the first surface 21 of the measurement object 20 based on the first interference pattern IFP1 and the second interference pattern IFP2.

For example, the first height information may be understood as a vertical height value from one point on the first surface 21 or a virtual reference plane including the one point to a first point.

For example, the computing device 170 may compute a vertical height value from one point on the first surface 21 of the measurement object 20 or a virtual reference plane including the one point to a first point, based on the first interference pattern IFP1 and the second interference pattern IFP2.

According to an example embodiment, the measurement object 20 may be a semiconductor wafer.

At least one integrated circuit and interconnection may be formed on a second surface 22, parallel to the first surface 21 of the measurement object 20.

Accordingly, for example, the first surface 21 of the measurement object 20 may be referred to as a back-side of a semiconductor wafer, and the second surface 22 of the measurement object 20 may be referred to as a front-side of the semiconductor wafer.

For example, the computing device 170 may compute height information of each point on the back-side of the semiconductor wafer. Thus, the computing device 170 may measure a height of a particle generated on the back-side of the semiconductor wafer during a process of manufacturing the semiconductor wafer.

Referring to the above-described configurations, the semiconductor measuring device 100 may obtain height information of each point on the first surface 21 of the measurement object 20 using a plurality of lights L1 and L2 entering the camera 160 at different angles.

Thus, the semiconductor measuring device 100 may increase a measurement range of the height information of each point of the measurement object 20.

Also, referring to the above-described configurations, the semiconductor measuring device 100 may obtain height information of each point of the measurement object 20 using a plurality of lights L1 and L2 passing through the same optical element (for example, the first beam splitter 121, the beam displacer 130, or the second beam splitter 122).

Thus, the semiconductor measuring device 100 may significantly reduce an effect of vibrations, occurring in the optical path of the plurality of lights L1 and L2, on measurement results.

Accordingly, the semiconductor measuring device 100 may improve the stability in measuring the height information of the measurement object 20.

In addition, referring to the above-described configurations, the semiconductor measuring device 100 may obtain the height information for each point of the measurement object 20 using a plurality of lights L1 and L2 output from different light sources 111 and 112.

Thus, the semiconductor measuring device 100 may improve the speed of measurement of the height information of the measurement object 20.

In addition, referring to the above-described configurations, the semiconductor measuring device 100 may include the beam displacer 130 to be implemented with a relatively simple or less complex configuration, compared to the case in which distinct optical paths are formed in the plurality of lights L1 and L2, respectively.

As a result, the semiconductor measuring device 100 may have a relatively small size.

Figure 2A:
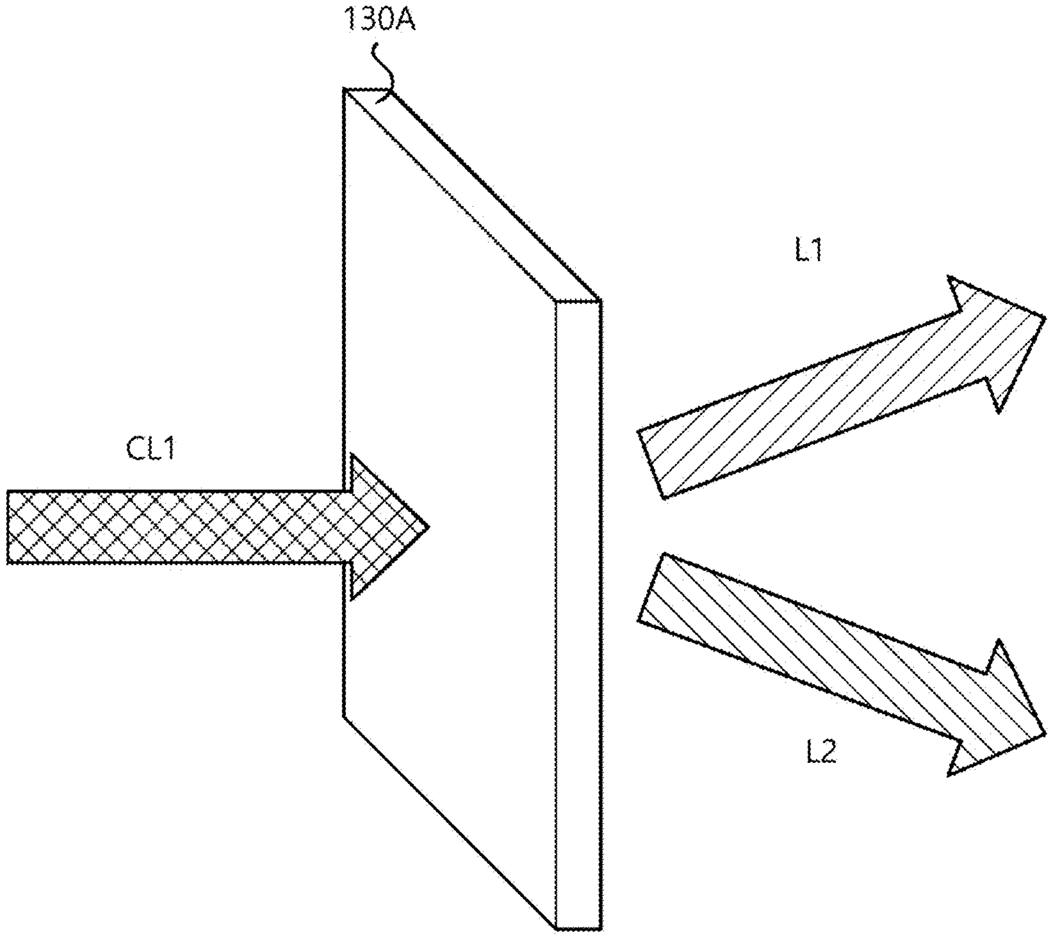
FIGS. 2A and 2B are diagrams illustrating a first light and a second light separated through a beam displacer according to an example embodiment.
Figure 2B:
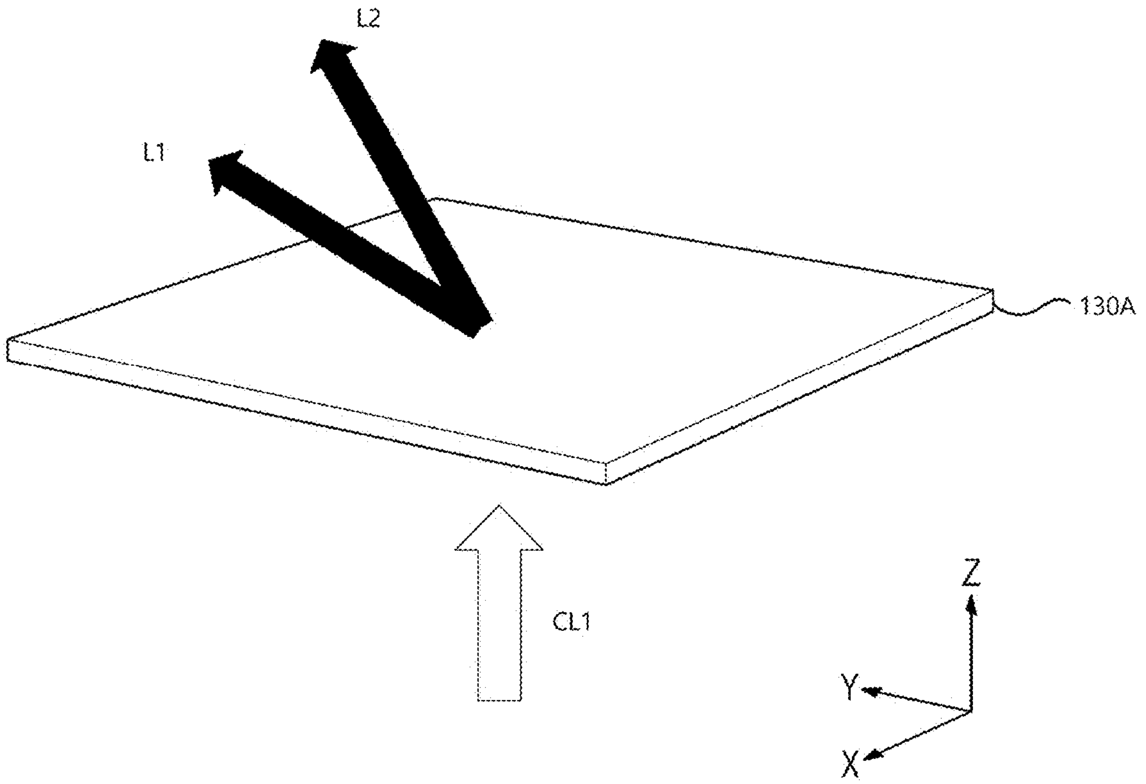
Figure 2C:
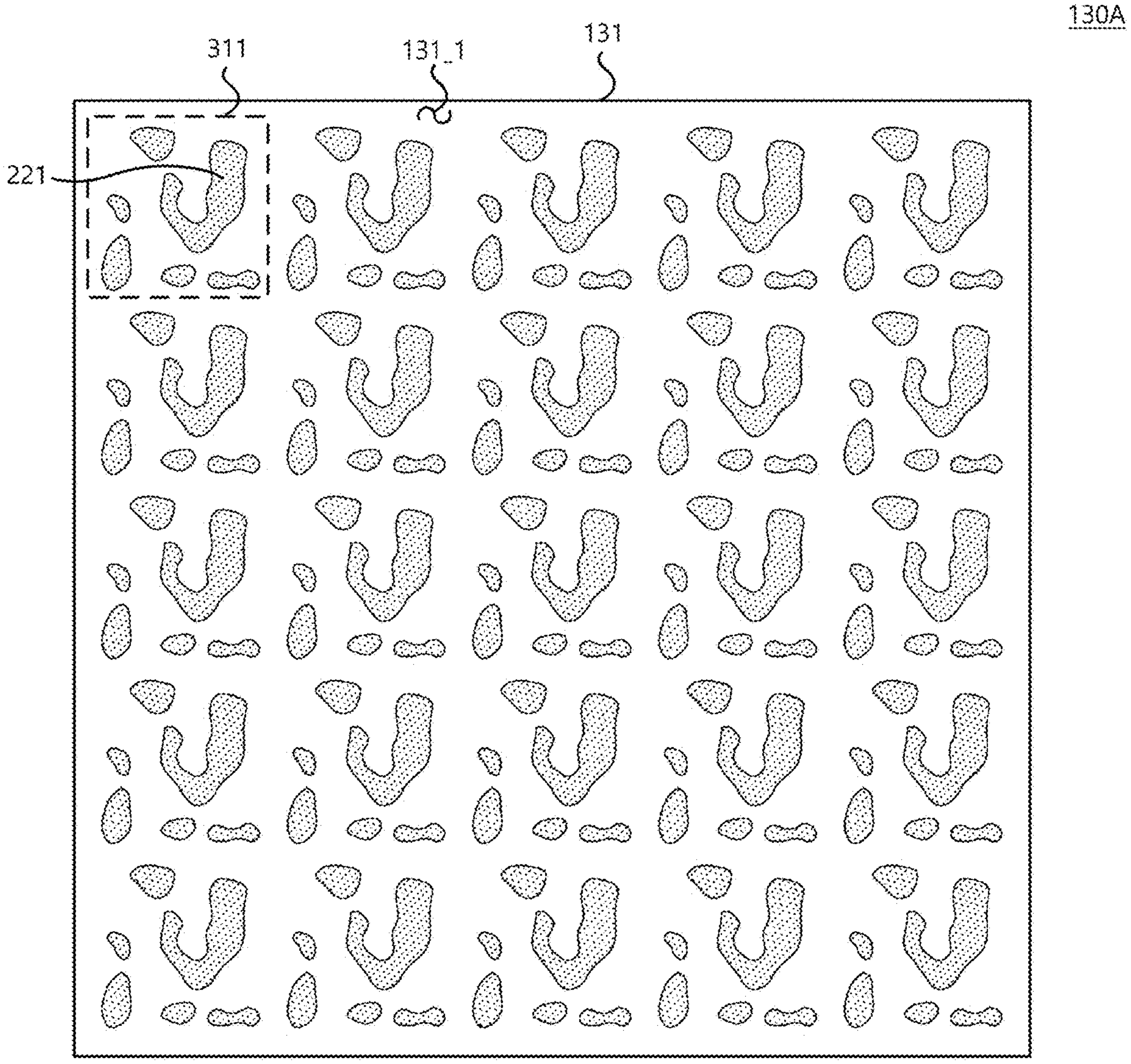
FIG. 2C is a plan view illustrating a surface of the beam displacer of FIGS. 2A and 2B.
Figure 2D:
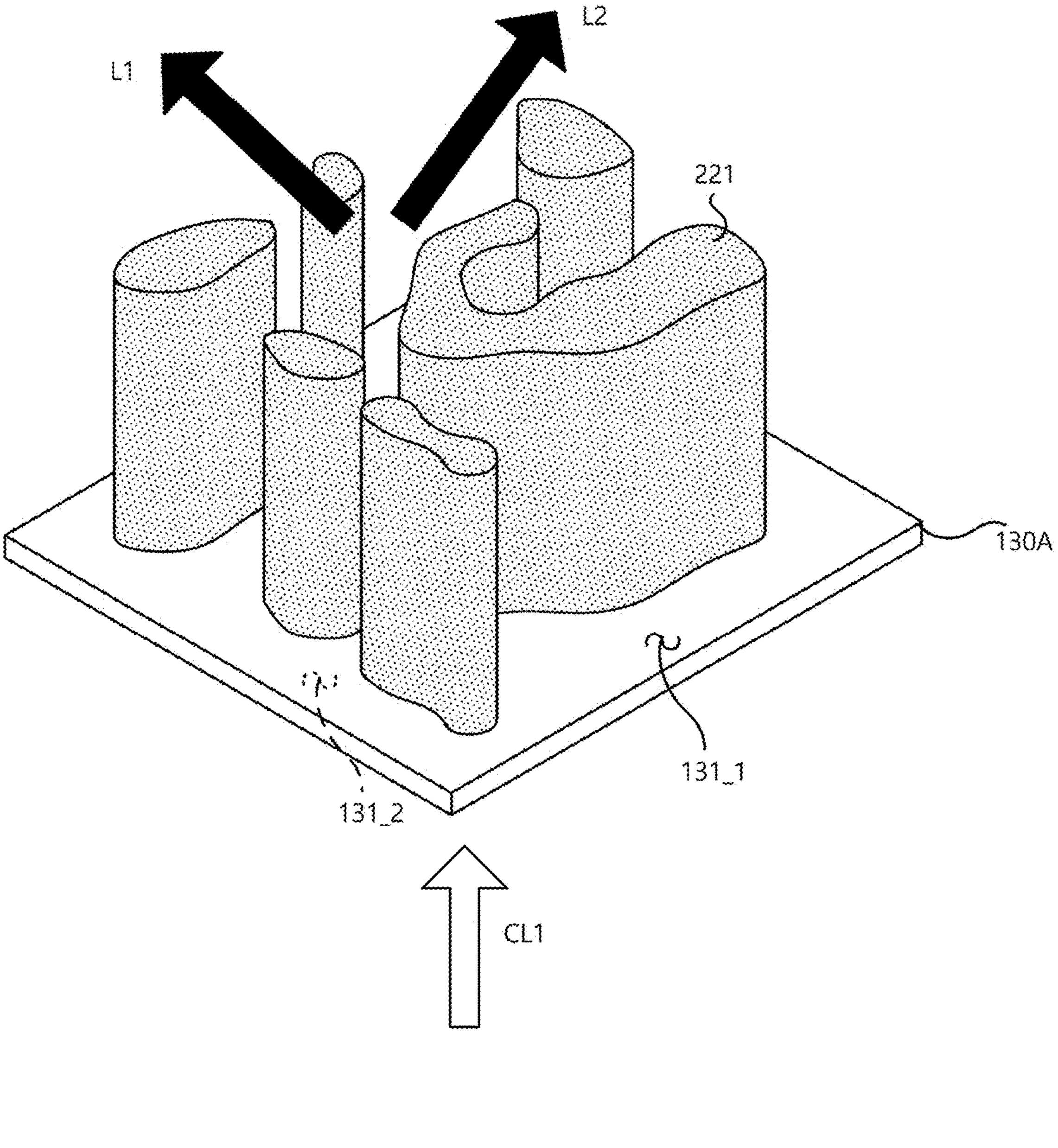
FIG. 2D is a perspective view illustrating a first region in FIG. 2C.
Figure 3:
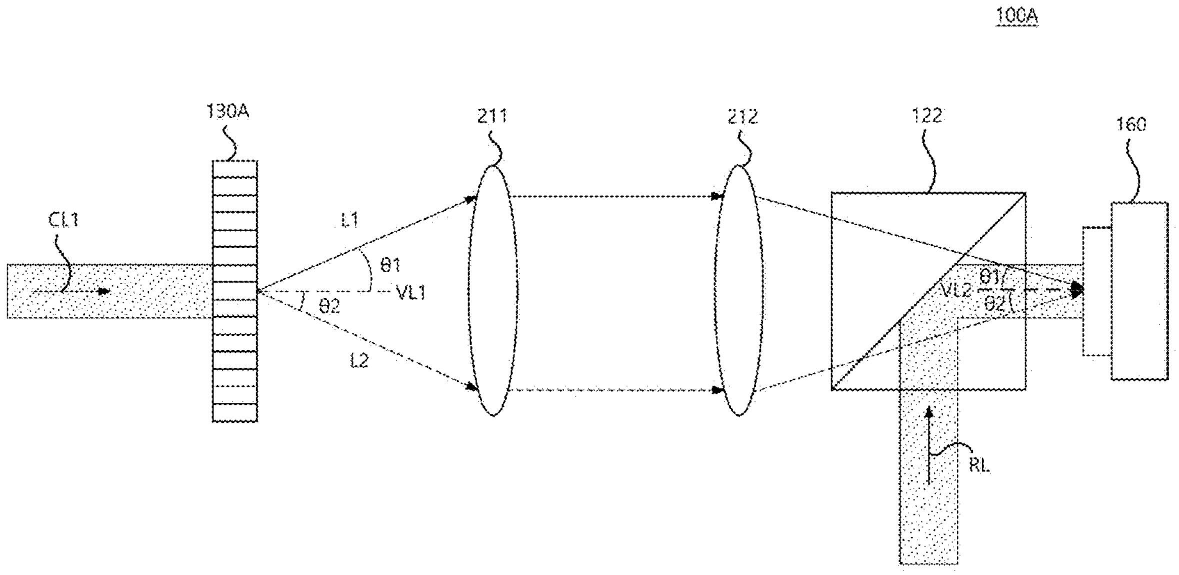
FIG. 3 is a diagram illustrating a configuration in which a first light and a second light separated according to an example embodiment pass through a plurality of lenses and then enter a camera.
Figure 4:
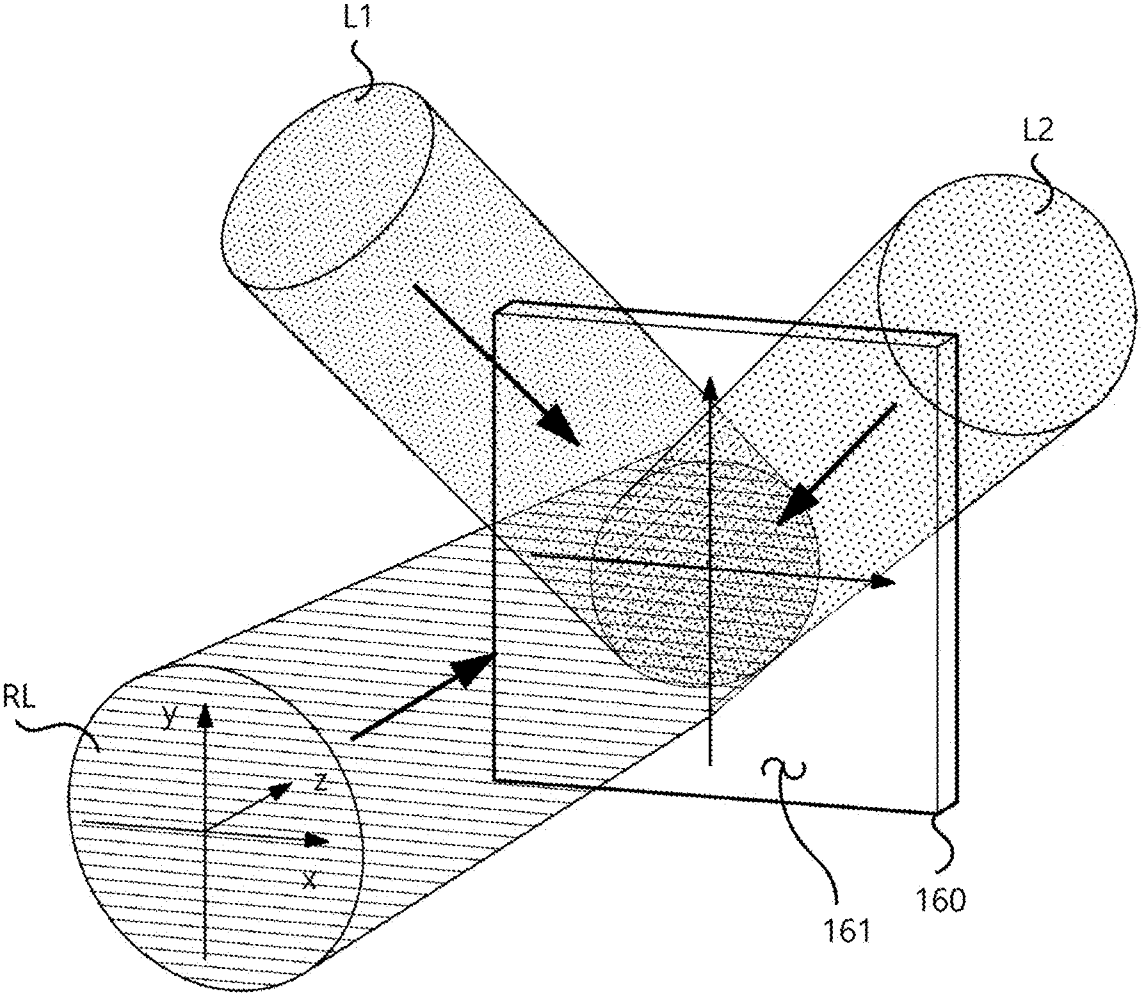
FIG. 4 is a diagram illustrating configuration in which a reflected light, a first light, and a second light according to an example embodiment enter a camera at different angles.

FIGS. 2A and 2B are diagrams illustrating a first light and a second light separated through a beam displacer according to an example embodiment. FIG. 2C is a plan view illustrating a surface of the beam displacer of FIGS. 2A and 2B. FIG. 2D is a perspective view illustrating a first region in FIG. 2C. FIG. 3 is a diagram illustrating a configuration in which a first light and a second light separated according to an example embodiment pass through a plurality of lenses and then enter a camera. FIG. 4 is a diagram illustrating configuration in which a reflected light, a first light, and a second light according to an example embodiment enter a camera at different angles.

Referring to FIGS. 2A to 2D, a beam displacer 130A of a semiconductor measuring device 100A according to an example embodiment may separate a first combined light CL1 into a first light L1 and a second light L2. For example, the beam displacer 130A may separate the first combined light CL1 into the first light L1 and the second light L2 (i.e., component beams L1 and L2) that propagate in different directions.

The semiconductor measuring device 100A and beam displacer 130A illustrated in FIGS. 2A to 2D may be understood as examples of the semiconductor measuring device 100 and the beam displacer 130 illustrated in FIG. 1A, respectively.

Therefore, the same or substantially the same components are denoted by the same or substantially the same reference numerals, and redundant descriptions are omitted to avoid repetition.

Referring to FIGS. 2A and 2B, the first combined light CL1 according to an example embodiment may pass through the beam displacer 130A to be separated into a first light L1 and a second light L2 that propagate in different directions.

For example, the first combined light CL1 may pass through the beam displacer 130A to be separated into a first light L1 and a second light L2 that propagate at different angles with respect to a direction in which the first combined light CL1 enters the beam displacer 130A (for example, a positive Z-direction).

Referring to FIGS. 2C and 2D, a beam displacer 130A according to an example embodiment may include a glass layer 131 and a protrusion pattern 221.

The beam displacer 130A may include a glass layer 131 transmitting an incident first combined light CL1.

Referring to FIG. 2C, the beam displacer 130A may include a plurality of protrusion patterns 221 having substantially the same shape on one surface 131_1 of the glass layer 131.

For example, the plurality of protrusion patterns 221 may have substantially the same shape on the one surface 131_1 of the glass layer 131 and may be provided in the form of an array, but example embodiments are not limited thereto.

Referring to FIGS. 2C and 2D, the beam displacer 130A may include a protrusion pattern 221 formed in a first region 311 of the one surface 131_1 of the glass layer 131.

For example, the protrusion pattern 221 may include titanium dioxide ($TiO_2$), but example embodiments are not limited thereto.

For example, the beam displacer 130A may include a protrusion pattern 221 formed to have a predetermined shape in the first region 311 of the one surface 131_1 of the glass layer 131.

For example, the protrusion pattern 221 may have a shape causing a plurality of lights L1 and L2, incident through the glass layer 131, to be refracted with different refractive indices depending on the wavelength of each light.

According to an example embodiment, the first light L1 and the second light L2 may be refracted in different directions by the protrusion pattern 221.

For example, the first combined light CL1 may enter the glass layer 131 from the other or opposing surface 131_2, parallel to the one surface 131_1.

In addition, the first combined light CL1 may pass through the glass layer 131 and be refracted by the protrusion pattern 221, formed on the one surface 131_1 of the glass layer 131, to be separated into the first light L1 and the second light L2 that propagate in different directions.

Referring to FIG. 3, the first light L1 and the second light L2 may be output from the one surface of the beam displacer 130A at different angles.

For example, the first light L1 may propagate in a direction having a first angle θ1 with respect to a virtual first line VL1, perpendicular to the one surface 130A of the beam displacer 130A.

The second light L2 may propagate in a direction having a second angle θ2 with respect to the virtual first line VL1.

For example, the first angle θ1 and the second angle θ2 may have different values, but example embodiments are not limited thereto.

The semiconductor measuring device 100A may include a first lens 211 and a second lens 212 disposed between the beam displacer 130A and the second beam splitter 122.

For example, the semiconductor measuring device 100A may include a first lens 211 disposed adjacent to the beam displacer 130A. In addition, the semiconductor measuring device 100A may include a second lens 212 disposed between the first lens 211 and the second beam splitter 122.

Each of the first lens 211 and the second lens 212 may have the form of a convex lens, but example embodiments are not limited thereto.

According to an example embodiment, the first light L1 and the second light L2 that have passed through the beam displacer 130A may pass through the first lens 211 and propagate in parallel towards the second lens 212.

According to an example embodiment, the first light L1 and the second light L2 that have passed through the beam displacer 130A may pass through the first lens 211 and be focused or directed onto the second lens 212 with a predetermined angle therebetween.

The first light L1 and the second light L2 that have passed through the second lens 212 may be focused or directed onto the second beam splitter 122. The second beam splitter 122 may transmit the incident first light L1 and second light L2.

Accordingly, the first light L1 and the second light L2 that have passed through the second lens 212 may be focused onto the camera 160 through the second beam splitter 122.

Referring to FIG. 4, the first light L1 and the second light L2 may enter one surface 161 of the camera 160 at different angles.

According to an example embodiment, the first light L1 may enter the one surface 161 of the camera 160 at a first angle θ1 with respect to a virtual second line VL2, perpendicular to the one surface 161 of the camera 160. The second light L2 may enter one surface 161 of the camera 160 at a second angle θ2 with respect to the virtual second line VL2, perpendicular to the one surface 161 of the camera 160.

The reflected light RL may be reflected by the second beam splitter 122. For example, the reflected light RL may be reflected by the second beam splitter 122 and enter the one surface 161 of the camera 160.

The reflected light RL may be referred to as a reflected light of the second combined light CL2 incident from the measurement object 20.

Referring to FIG. 4, the reflected light RL may enter one surface 161 of the camera 160 in a direction, perpendicular to the one surface 161 of the camera 160, (for example, a positive Z-direction), but example embodiments are not limited thereto.

For example, the one surface 161 of the camera 160 may be referred to a charge-coupled device (CCD) or other image sensor surface converting a light received by the camera 160 into an electrical signal.

According to an example embodiment, the first light L1, the second light L2, and the reflected light RL, respectively entering the one surface 161 of the camera 160 at different angles, may be optically combined or may otherwise form a plurality of interference patterns IFP1 and IFP2 through the one surface 161 of the camera 160.

For example, the first light L1 and the reflected light RL, respectively entering the one surface 161 of the camera 160 at different angles, may form a first interference pattern IFP1.

In addition, the second light L2 and the reflected light RL, respectively entering the one surface 161 of the camera 160 at different angles, may form a second interference pattern IFP2.

The computing device 170 may obtain height information of each point constituting the first surface 21 of the measurement object 20, based on the first interference pattern IFP1 and the second interference pattern IFP2.

Referring to the above-described configurations, the semiconductor measuring device 100A may obtain height information for each point of the target object 20 using the plurality of lights L1 and L2 entering the camera 160 at different angles.

Thus, the semiconductor measuring device 100A may increase a measurement range of height information of each point of the target object 20.

Also, referring to the above-described configurations, the semiconductor measuring device 100A may obtain height information of each point of the measurement object 20 using the plurality of lights L1 and L2 passing through the same optical path.

Thus, the semiconductor measuring device 100A may significantly reduce an effect of vibrations, occurring in the optical path of the plurality of lights L1 and L2, on the measurement results.

Accordingly, the semiconductor measuring device 100A may improve the stability in measuring the height information of the measurement object 20.

In addition, referring to the above-described configurations, the semiconductor measuring device 100A may include the beam displacer 130A to be implemented with a relatively simple or less complex configuration, compared to the case in which distinct optical paths are formed in the plurality of lights L1 and L2, respectively.

As a result, the semiconductor measuring device 100A may have a relatively small size.

Figure 5A:
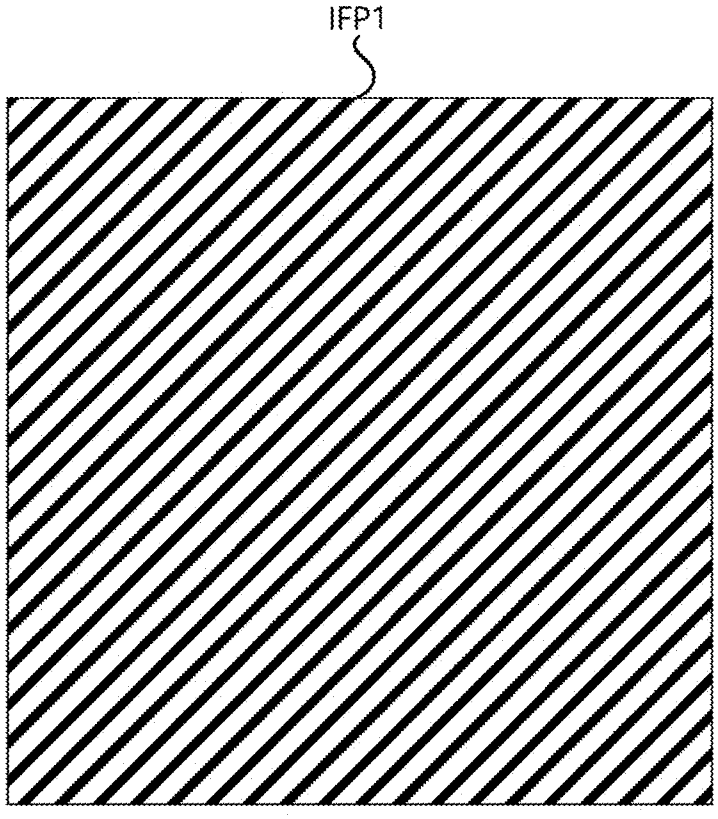
FIG. 5A is a diagram illustrating a first interference pattern between a first light and a reflected light according to an example embodiment.
Figure 5B:
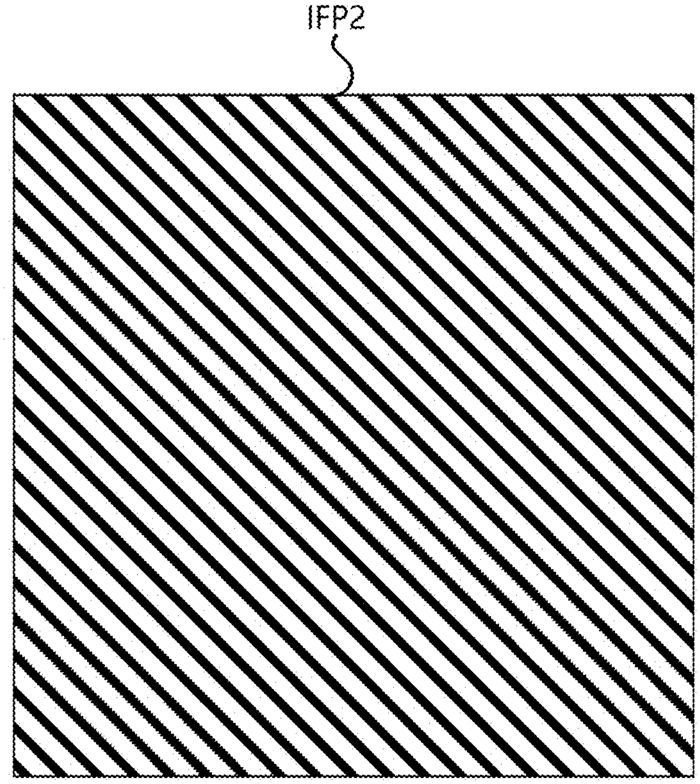
FIG. 5B is a diagram illustrating a second interference pattern between a second light and a reflected light according to an example embodiment.
Figure 5C:
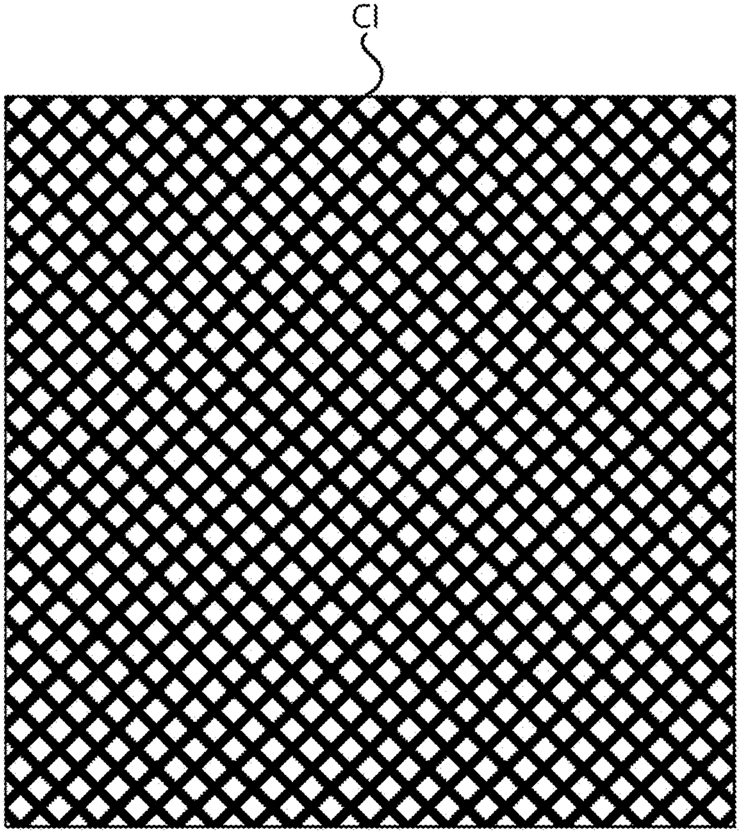
FIG. 5C is a diagram illustrating a combined image obtained by combining the first interference pattern of FIG. 5A and the second interference pattern of FIG. 5B.
Figure 6A:
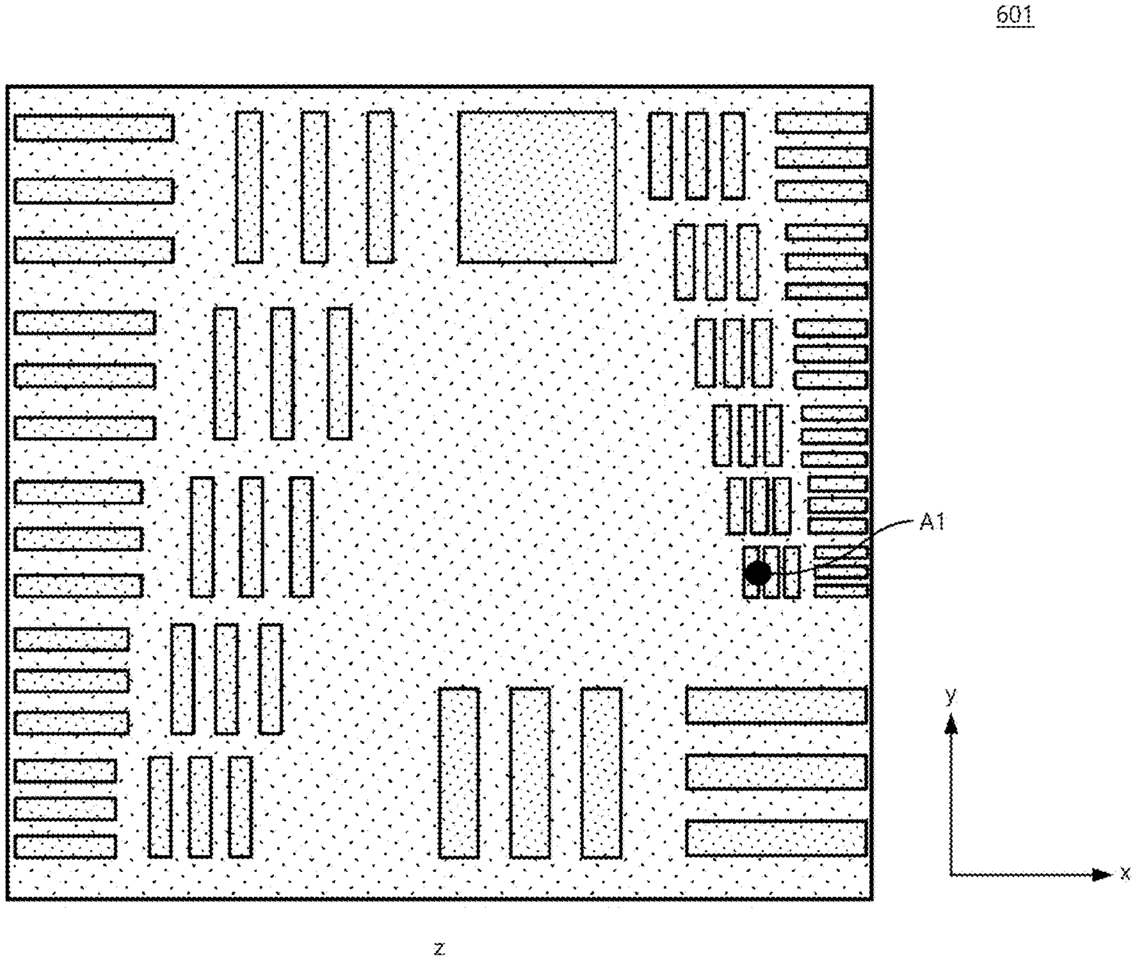
FIG. 6A is a diagram illustrating a first phase image generated based on a combined image according to an example embodiment.
Figure 6B:
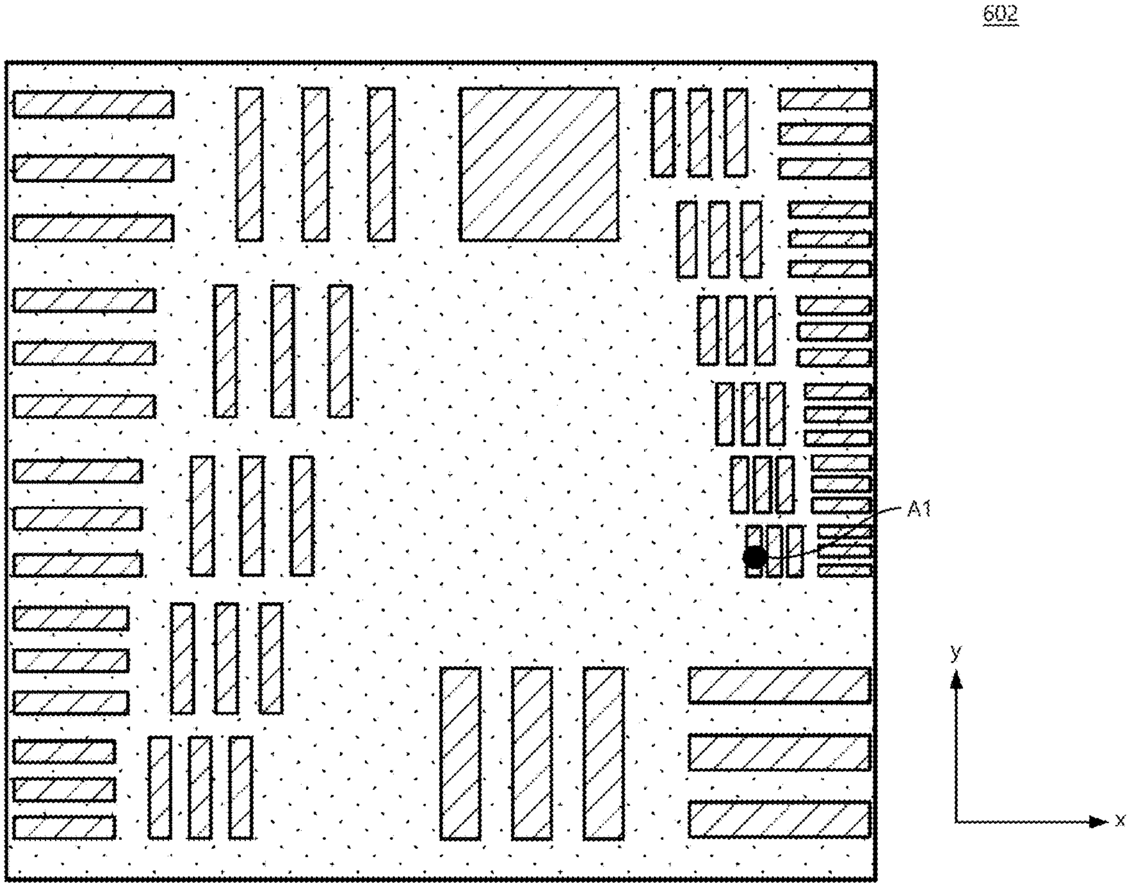
FIG. 6B is a diagram illustrating a second phase image generated based on a combined image according to an example embodiment.
Figure 7A:
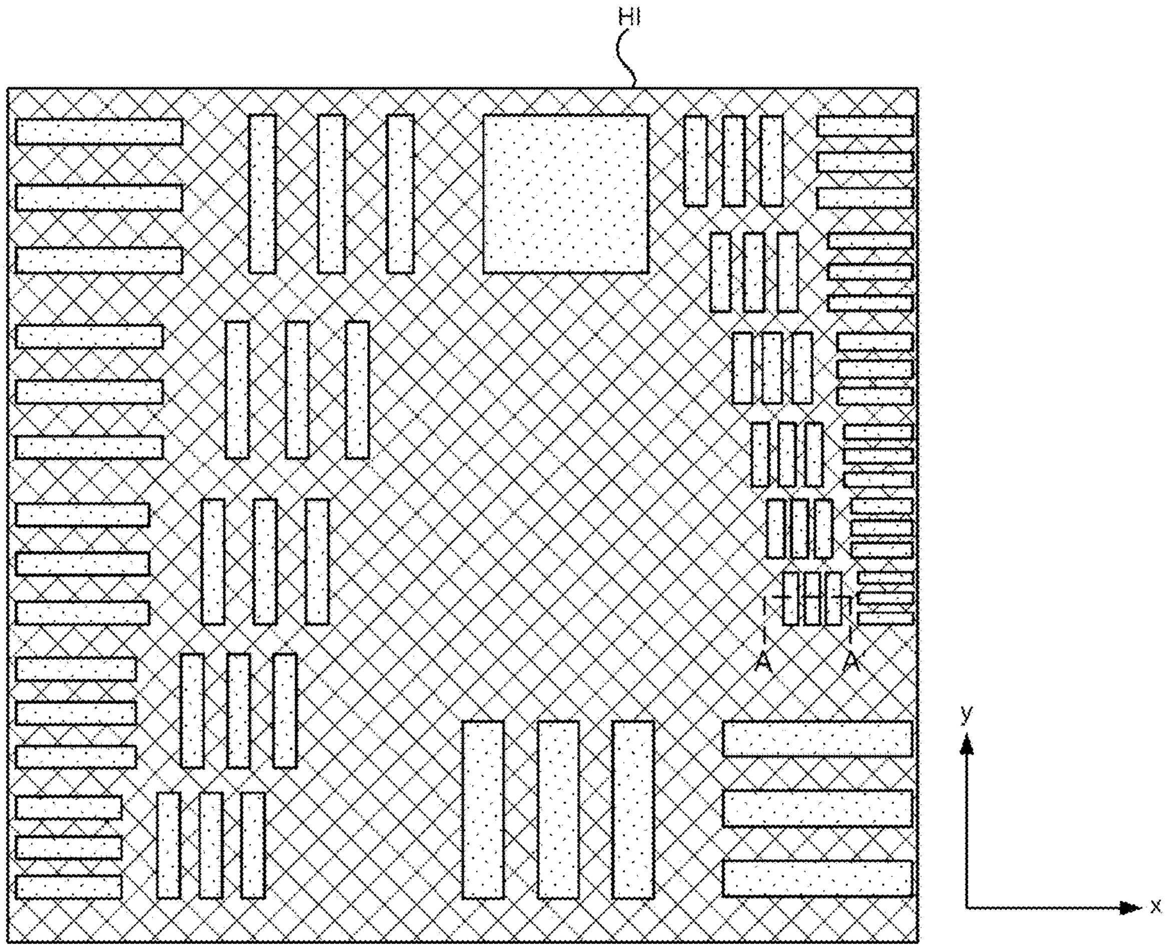
FIG. 7A is a diagram illustrating a height image generated based on phase information for each wavelength according to an example embodiment.
Figure 7B:
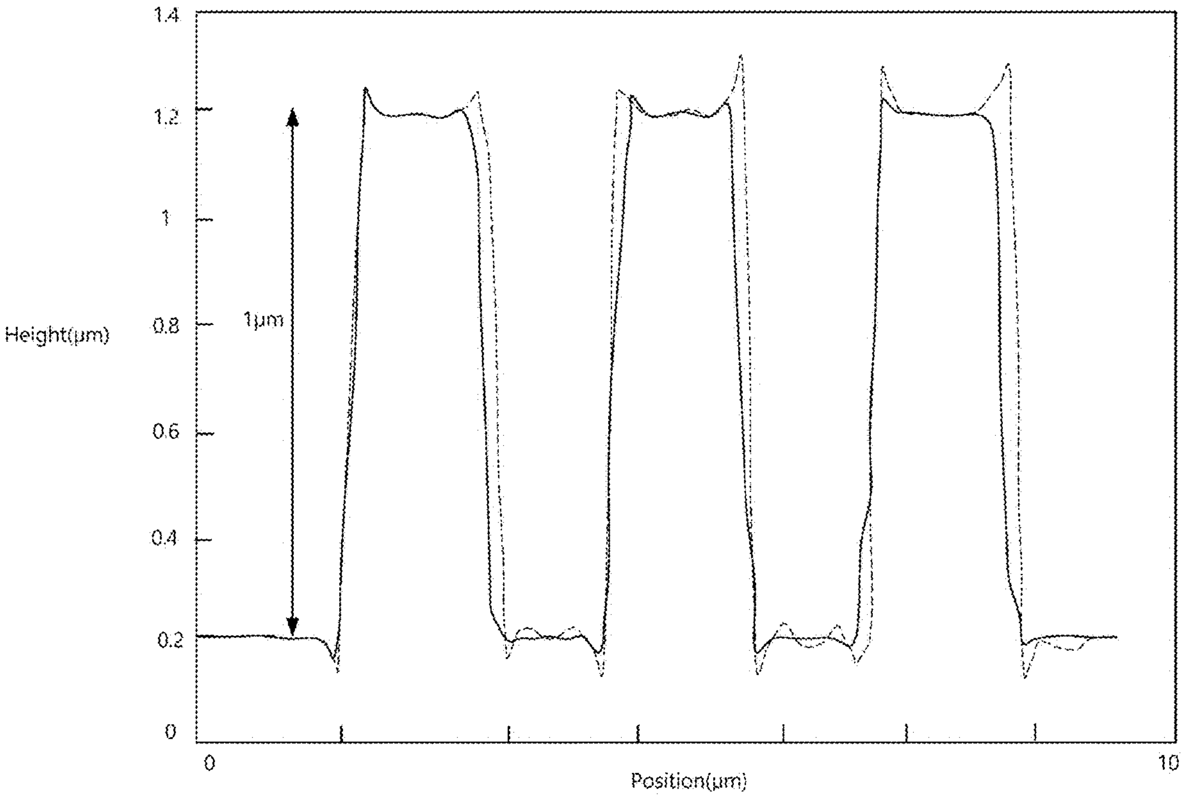
FIG. 7B is a graph illustrating height information of a portion corresponding to line A-A' of the height image of FIG. 7A.

FIG. 5A is a diagram illustrating a first interference pattern between a first light and a reflected light according to an example embodiment. FIG. 5B is a diagram illustrating a second interference pattern between a second light and a reflected light according to an example embodiment. FIG. 5C is a diagram illustrating a combined image obtained by combining the first interference pattern of FIG. 5A and the second interference pattern of FIG. 5B. FIG. 6A is a diagram illustrating a first phase image generated based on a combined image according to an example embodiment. FIG. 6B is a diagram illustrating a second phase image generated based on a combined image according to an example embodiment. FIG. 7A is a diagram illustrating a height image generated based on phase information for each wavelength according to an example embodiment. FIG. 7B is a graph illustrating height information of a portion corresponding to line A-A' of the height image of FIG. 7A.

Referring to FIGS. 5A to 7B, the computing device 170 according to an example embodiment may obtain height information of each point constituting the first surface 21 of the measurement object 20 based on the first interference pattern IFP1 and the second interference pattern IFP2.

Referring to FIGS. 5A to 5C, the computing device 170 may generate a combined image CI using the first interference pattern IFP1 and the second interference pattern IFP2.

For example, the computing device 170 may generate a combined image CI by overlapping the first interference pattern IFP1 and the second interference pattern IFP2 received from the camera 160. In some embodiments, overlapping the first interference pattern IFP1 and the second interference pattern IFP2 may include optically and/or mathematically combining the patterns IFP1 and IFP2 (e.g., constructively and/or destructively), such that the patterns IFP1 and IFP2 are superimposed to generate the combined image CI.

According to an example embodiment, the camera 160 may generate a combined image CI by overlapping the first interference pattern IFP1 and the second interference pattern IFP2. The camera 160 may transmit the generated combined image CI to the computing device 170.

In addition, the computing device 170 may obtain first phase information corresponding to the first wavelength λ1 and second phase information corresponding to the second wavelength λ2 for a first point A1 of the combined image CI.

The first point A1 may be understood as an arbitrary point on the first surface 21 of the measurement object 20.

For example, the computing device 170 may obtain first phase information on the first point A1 corresponding to the first wavelength λ1 and second phase information on the first point A1 corresponding to the second wavelength λ2 by performing a Fourier transform on the combined image CI.

The computing device 170 according to an example embodiment may separate data corresponding to the first wavelength λ1 and data corresponding to the second wavelength λ2 from the combined image CI by performing the Fourier transform on the combined image CI.

For example, the computing device 170 may separate the data corresponding to the first wavelength λ1 and the data corresponding to the second wavelength λ2 in a frequency domain by performing the Fourier transform on the combined image CI.

Referring to FIGS. 6A and 6B, the computing device 170 according to an example embodiment may generate phase images 601 and 602, respectively corresponding to wavelengths, by performing an inverse Fourier transform on data corresponding to each of the wavelengths in a frequency domain.

For example, the computing device 170 may perform an inverse Fourier transform on the data corresponding to each of the wavelengths in the frequency domain to obtain phase data in the form of a complex number corresponding to each of the wavelengths.

In addition, the computing device 170 may substitute phase data in the form of the complex number, corresponding to each of the wavelengths, into an inverse trigonometric function (for example, an inverse tangent (arctan)) to generate phase images 601 and 602, respectively corresponding to the wavelengths.

For example, referring to FIG. 6A, the computing device 170 may generate a first phase image 601 corresponding to the first wavelength λ1 from the data corresponding to the first wavelength λ1 using an inverse Fourier transform and an inverse trigonometric function.

Referring to FIG. 6B, the computing device 170 may generate a second phase image 602 corresponding to the second wavelength λ2 from the data corresponding to the second wavelength λ2 using an inverse Fourier transform and an inverse trigonometric function.

Each of the first phase image 601 and the second phase image 602 may be understood as an image including phase information measured for each of the wavelengths λ1 and λ2 of the light L1 and L2 for the first surface 21 of the measurement object 20.

For example, the first phase image 601 may include first phase information $\phi_1$ (x, y) of each point on the first surface 21 of the measurement object 20 measured with the first light L1 having the first wavelength λ1.

The second phase image 602 may include second phase information $\phi_2$ (x, y) of each point on the first surface 21 of the measurement object 20 measured with the second light L2 having the second wavelength λ2.

In the first phase information $\phi_1$ (x, y) and the second phase information $\phi_2$ (x, y), each value of x and y may be understood as a coordinate value of each point in an x-y plane coordinate system including the first surface 21 of the measurement object 20.

Referring to FIGS. 7A and 7B, the computing device 170 according to an example embodiment may compute height information h(x, y) of each point included in the first surface 21 of the measurement object 20 based on the first phase image 601 and the second phase image 602.

Referring to FIG. 7A, the computing device 170 may generate a height image HI including the height information h(x, y) of each point included in the first surface 21 of the measurement object 20 based on the first phase image 601 and the second phase image 602.

For example, the computing device 170 may compute the height information h(x, y) of each point included in the first surface 21 of the measurement object 20 using the first phase information $\phi_1$ (x, y) and the second phase information $\phi_2$ (x, y).

For example, the computing device 170 may compute the height information h(x, y) of each point included in the first surface 21 of the measurement object 20, based on the following Equation 1.

$$h(x, y) = \frac{1}{2}\frac{\lambda_1\lambda_2}{\lambda_2 - \lambda_1}\frac{\phi_1(x, y) - \phi_2(x, y)}{2\pi} \qquad \text{Equation 1}$$

Referring to FIG. 7B, the computing device 170 may determine that a portion corresponding to line A-A' on the first surface 21 of the measurement object 20 includes a portion protruding by a height of 1 μm from the first surface 21 of the measurement object 20.

For example, the computing device 170 may determine that there is a particle, protruding by 1 μm from the first surface 21 of the measurement object 20, in the portion corresponding to line A-A' of the measurement object 20.

For example, the computing device 170 may determine that there is a particle, protruding by 1 μm from a virtual reference plane including a point on the first surface 21 of the measurement object 20, in the portion corresponding to line A-A' of the measurement object 20.

Referring to the above-described configurations, the computing device 170 may compute the height information h(x, y) of the measurement object 20 using the interference patterns IFP1 and IFP2 generated from the plurality of lights L1 and L2 entering the camera 160 at different angles.

As a result, the semiconductor measuring device 100 may increase a measurement range of height information h(x, y) of each point on the first surface 21 of the measurement object 20.

Figure 8A:
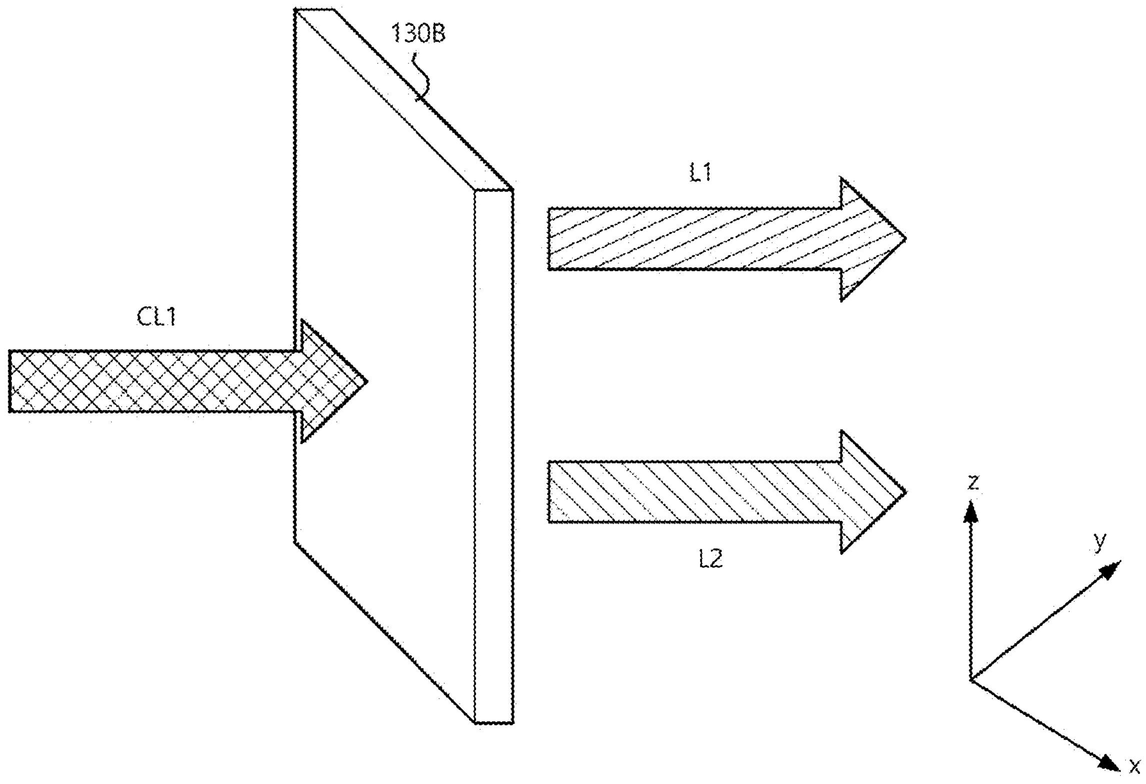
FIG. 8A is a diagram illustrating a first light and a second light separated through a beam displacer according to an example embodiment.
Figure 8B:
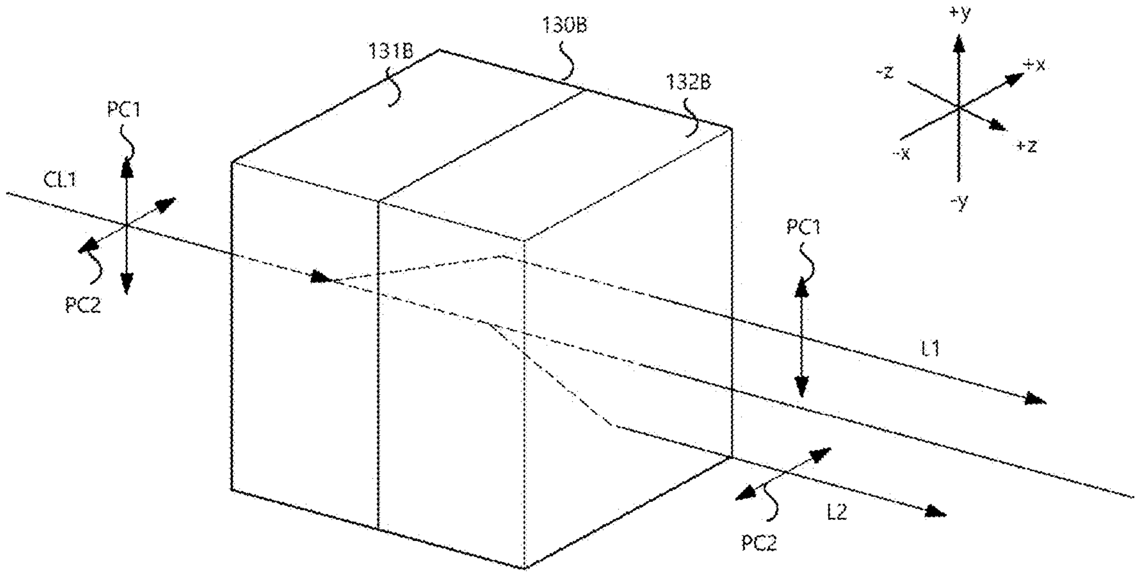
FIG. 8B is a diagram illustrating a specific configuration of the beam displacer of FIG. 8A.
Figure 8C:
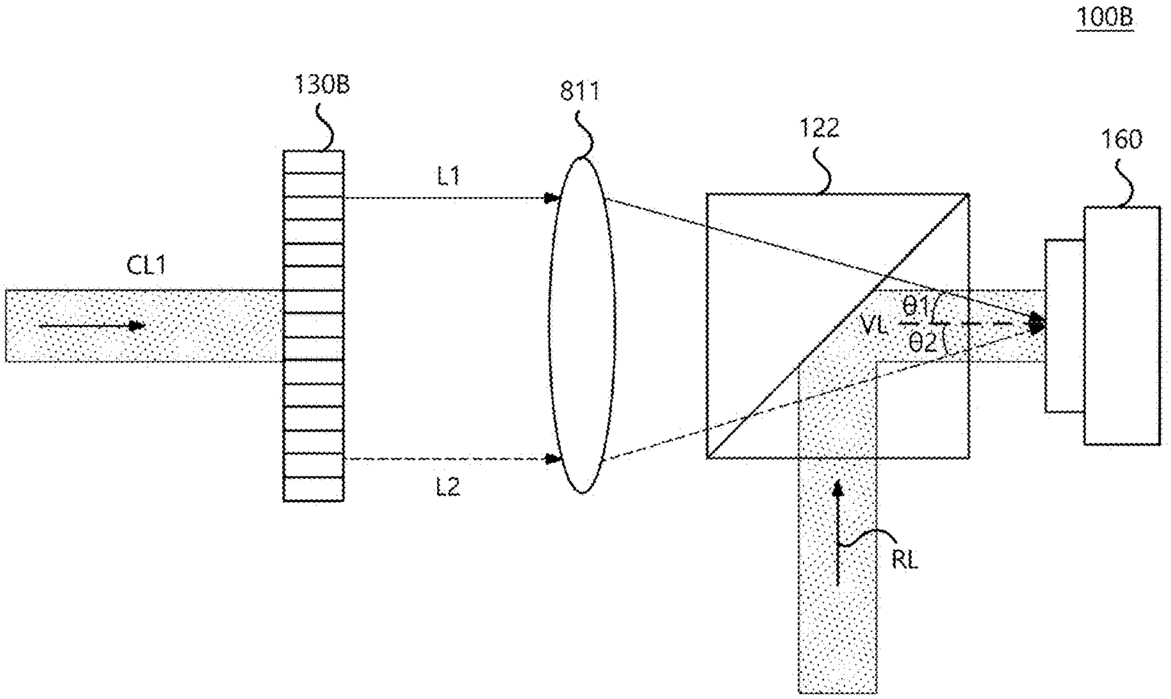
FIG. 8C is a diagram illustrating a configuration in which the first light and the second light separated through the beam displacer of FIG. 8A enter a camera.

FIG. 8A is a diagram illustrating a first light and a second light separated through a beam displacer according to an example embodiment. FIG. 8B is a diagram illustrating a specific configuration of the beam displacer of FIG. 8A. FIG. 8C is a diagram illustrating a configuration in which the first light and the second light separated through the beam displacer of FIG. 8A enter a camera.

Referring to FIGS. 8A to 8C, a beam displacer 130B according to an example embodiment may separate first combined light CL1 into a first light L1 and a second light L2.

Referring to FIG. 8B, the first light L1 may have a first polarization component PC1 in ±y direction. Also, the second light L2 may have a second polarization component PC2 in ±x direction, different from the first polarization component PC1. Therefore, the first combined light CL1 may be understood as a light including the polarization components PC1 and PC2.

The beam displacer 130B illustrated in FIGS. 8A to 8C may be understood as an example of the beam displacer 130 illustrated in FIG. 1A. Therefore, the same or substantially the same components are denoted by the same or substantially the same reference numerals, and redundant descriptions are omitted to avoid repetition.

According to an example embodiment, the first combined light CL1 may be separated into the first light L1 and the second light L2 that pass through the beam displacer 130B and propagate with different coordinate values with respect to a z-axis in the coordinate system.

For example, the first combined light CL1 may be separated into the first light L1 and the second light L2 that passes through the beam displacer 130B and propagate with different coordinate values with respect to the z-axis from the x-y coordinate plane.

Referring to FIG. 8B, the beam displacer 130B according to an example embodiment may include a first Savart plate 131B and a second Savart plate 132B.

For example, the beam displacer 130B may include a first Savart plate 131B that refracts the first light L1 having a first polarization component PC1, among the incident first combined light CL1.

Also, the beam displacer 130B may include a second Savart plate 132B that refracts the second light L2 having a second polarization component PC2 from a light that has passed through the first Savart plate 131B.

Therefore, the beam displacer 130B may be understood as an optical device refracting an incident light to different locations based on a polarization component of each light.

For example, the first Savart plate 131B and the second Savart plate 132B may be disposed to be in contact with each other, but example embodiments are not limited thereto. Alternatively, the first Savart plate 131B and the second Savart plate 132B may be disposed to be spaced apart from each other at regular intervals.

Referring to FIG. 8C, the first light L1 and the second light L2 may be output at different locations (or different coordinate values) on one surface of the beam displacer 130B.

For example, the first light L1 and the second light L2 may propagate in parallel at different locations on one surface of the beam displacer 130B.

Also, the semiconductor measuring device 100B may include a first lens 811 disposed between the beam displacer 130B and a second light splitter 122. The semiconductor measuring device 100B may be understood as an example of the semiconductor measuring device 100 illustrated in FIG. 1A.

For example, a first lens 811 may have the form of a convex lens, but example embodiments are not limited thereto.

According to an example embodiment, the first light L1 and the second light L2 that have passed through the beam displacer 130B may pass through the first lens 811 to be focused or directed onto the second beam splitter 122. The second beam splitter 122 may transmit the incident first light L1 and the second light L2.

Accordingly, the first light L1 and the second light L2 that have passed through the first lens 811 may be focused onto the camera 160 via the second beam splitter 122.

Also, the first light L1 and the second light L2 may enter the one side or surface 161 of the camera 160 at different angles.

According to an example embodiment, the first light L1 may enter the one surface 161 of the camera 160 at a first angle θ1 with respect to a virtual straight line VL, perpendicular to the one surface 161 of the camera 160. The second light L2 may enter the one surface 161 of the camera 160 at a second angle θ2 with respect to the virtual straight line VL, perpendicular to the one surface 161 of the camera 160.

A reflected light RL may be reflected by the second beam splitter 122. For example, the reflected light RL may be reflected by the second beam splitter 122 and enter the one surface 161 of the camera 160.

The reflected light RL may be referred to as a reflected light of the second combined light CL2 incident from the measurement object 20.

Also, the reflected light RL may be incident in a direction, perpendicular to the one surface 161 of the camera 160, but example embodiments are not limited thereto.

For example, the one surface 161 of the camera 160 may be referred to as a CCD surface converting the light received by the camera 160 into an electrical signal.

According to an example embodiment, the first light L1, the second light L2, and the reflected light RL, respectively entering the one surface 161 of the camera 160 at different angles, may form a plurality of interference patterns IFP1 and IFP2 through the one surface 161 of the camera 160.

For example, the first light L1 and the reflected light RL, respectively entering the one surface 161 of the camera 160 at different angles, may form the first interference pattern IFP1.

The second light L2 and the reflected light RL, respectively entering the one surface 161 of the camera 160 at different angles, may form the second interference pattern IFP2.

The computing device 170 may obtain height information of each point constituting the first surface 21 of the measurement object 20 based on the first interference pattern IFP1 and the second interference pattern IFP2.

Referring to the above-described configurations, the semiconductor measuring device 100B may obtain height information of each point of the measurement object 20 using the plurality of lights L1 and L2 entering the camera 160 at different angles.

Thus, the semiconductor measuring device 100B may increase a measurement range of height information of each point of the measurement object 20.

Also, referring to the above-described configurations, the semiconductor measuring device 100B may obtain height information of each point of the measurement object 20 using the plurality of lights L1 and L2 passing through the same optical path.

Thus, the semiconductor measuring device 100B may significantly or substantially reduce an effect of vibrations, occurring in the optical path of the plurality of lights L1 and L2, on the measurement results.

As a result, the semiconductor measuring device 100B may improve the stability in measuring height information of the measurement object 20.

In addition, referring to the above-described configurations, the semiconductor measuring device 100B may include the beam displacer 130B to be implemented with a relatively simple or less complex configuration, compared to the case in which distinct optical paths are formed in the plurality of lights L1 and L2, respectively.

As a result, the semiconductor measuring device 100B may have a relatively small size.

Figure 9:
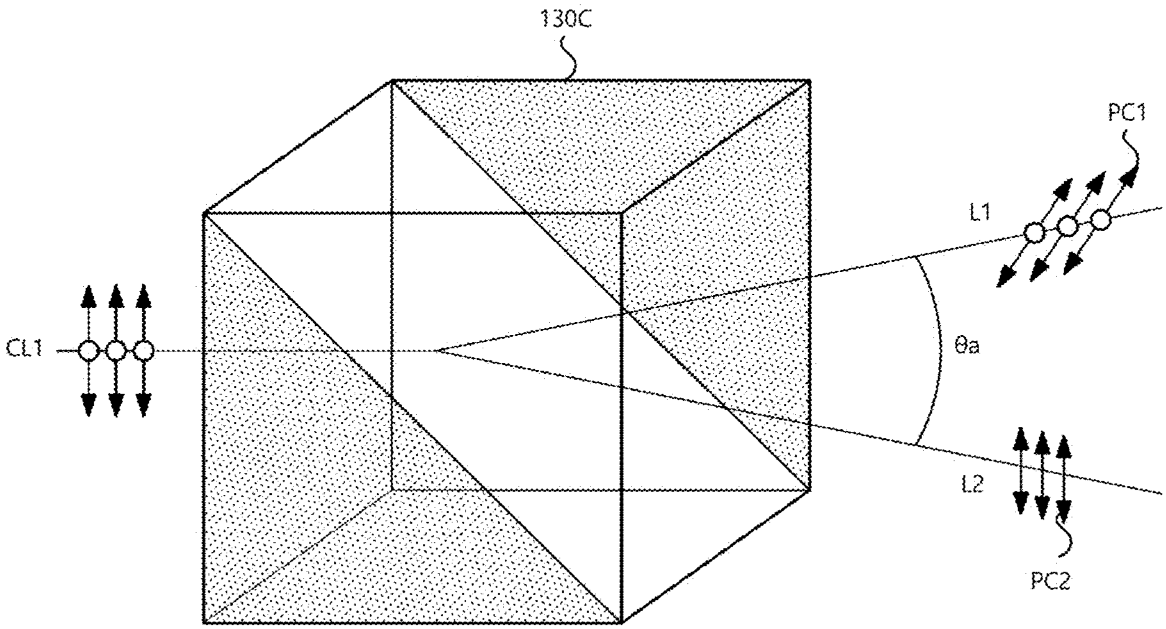
FIG. 9 is a diagram illustrating a first light and a second light separated through a beam displacer according to an example embodiment.

FIG. 9 is a diagram illustrating a first light and a second light separated through a beam displacer according to an example embodiment.

Referring to FIG. 9, a beam displacer 130C according to an example embodiment may separate first combined light CL1 into a first light L1 and a second light L2.

The first light L1 may have a first polarization component PC1. Also, the second light L2 may have a second polarization component PC2, different from the first polarization component PC1. Therefore, the first combined light CL1 may be understood as a light that including the polarization components PC1 and PC2.

The beam displacer 130C illustrated in FIG. 9 may be understood as an example of the beam displacer 130 illustrated in FIG. 1A. Therefore, the same or substantially the same components are denoted by the same or substantially the same reference numerals, and redundant descriptions are omitted to avoid repetition.

According to an example embodiment, a first combined light CL1 may pass through the beam displacer 130C to be separated into a first light L1 and a second light L2 that propagate in different directions.

For example, the first combined light CL1 may pass through the beam displacer 130C to be separated into a first light L1 and a second light L2 that propagate in different directions with a first angle θa therebetween.

The beam displacer 130C may be understood as an optical device refracting an incident light to different locations based on a polarization component of each light.

Therefore, the beam displacer 130C may be referred to as a Wollaston prism.

Referring to the above-described configurations, the beam displacer 130C may separate and propagate the plurality of lights L1 and L2 with a relatively simple or less complex configuration, compared to the case in which distinct optical paths are formed for the plurality of lights L1 and L2, respectively.

As a result, a system or device (for example, the semiconductor measuring device 100 of FIG. 1A) including the beam displacer 130C according to an example embodiment may have a relatively small size.

Figure 10A:
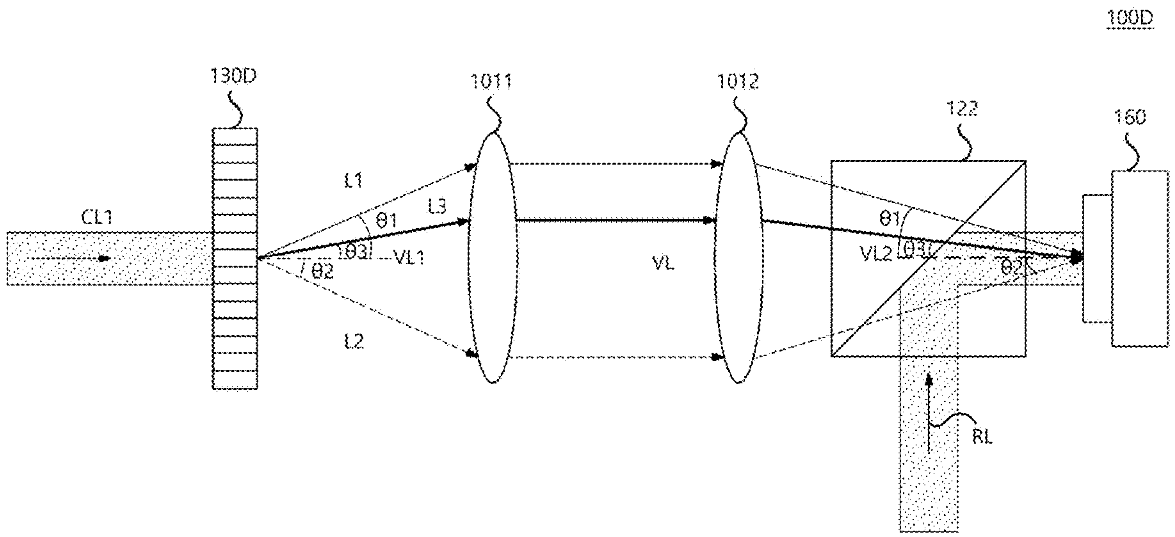
FIG. 10A is a diagram illustrating a first light, a second light, and a third light separated through a beam displacer according to an example embodiment.
Figure 10B:
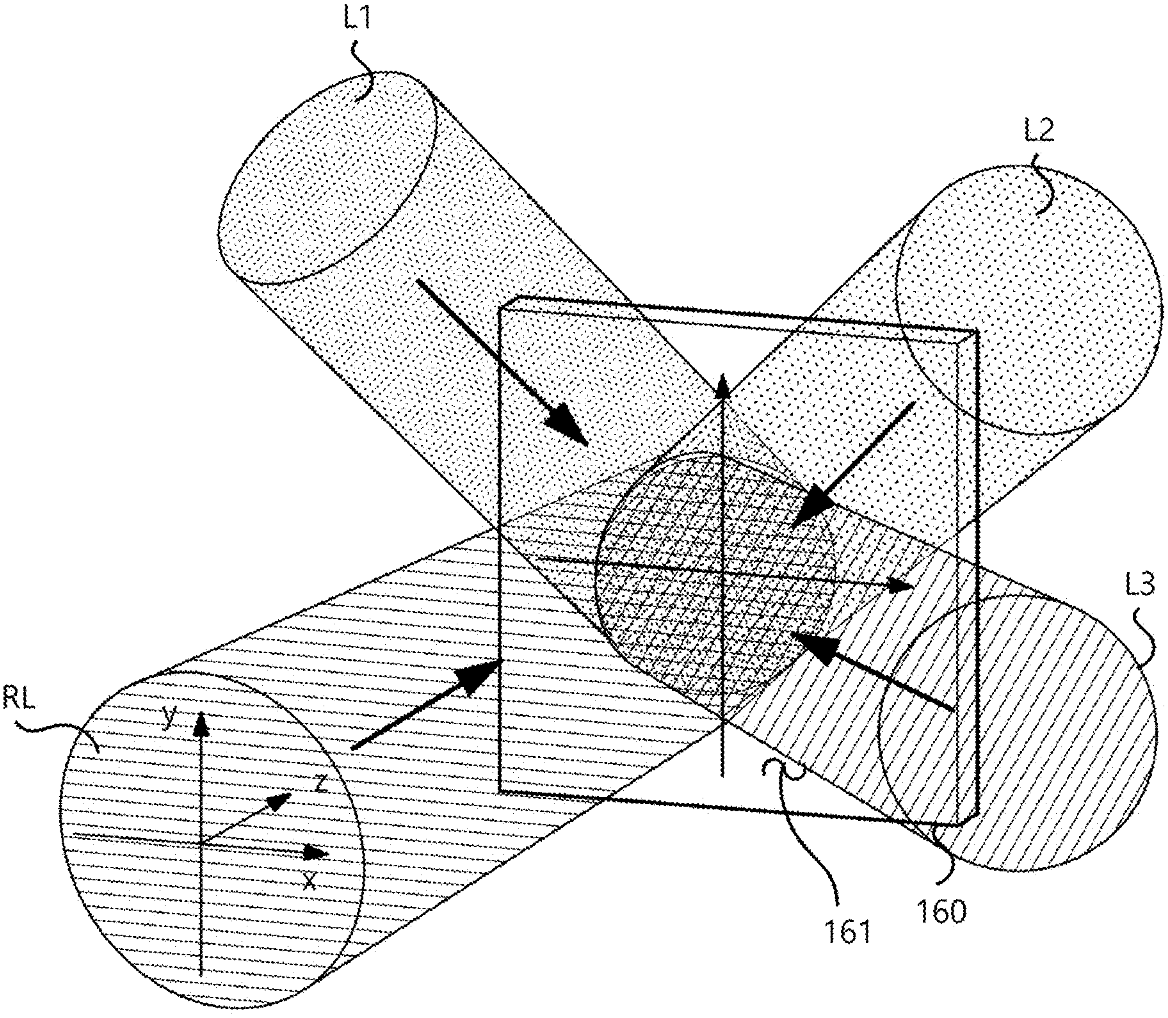
FIG. 10B is a diagram illustrating a configuration in which a reflected light, a first light, a second light, and a third light according to an example embodiment enter a camera at different angles.

FIG. 10A is a diagram illustrating a first light, a second light, and a third light separated through a beam displacer according to an example embodiment. FIG. 10B is a diagram illustrating a configuration in which a reflected light, a first light, a second light, and a third light according to an example embodiment enter a camera at different angles.

Referring to FIGS. 10A and 10B, the beam displacer 130D according to an example embodiment may separate a first combined light CL1 into a first light L1, a second light L2, and a third light L3. For example, the beam displacer 130D may separate the first combined light CL1 into the first light L1, the second light L2, and the third light L3 that propagate in different directions.

The first light L1, the second light L2, and the third light L3 may be understood as lights having different wavelengths, respectively.

The semiconductor measuring device 100D and the beam displacer 130D illustrated in FIG. 10A may be understood as examples of the semiconductor measuring device 100 and the beam displacer 130 illustrated in FIG. 1A, respectively. Therefore, the same or substantially the same components are denoted by the same or substantially the same reference numerals, and redundant descriptions are omitted to avoid repetition.

According to an example embodiment, the first combined light CL1 may pass through the beam displacer 130D to be separated into a first light L1, a second light L2, and a third light L3 that propagate in different directions.

For example, the first combined light CL1 may pass through the beam displacer 130D to be separated into a first light L1, a second light L2, and a third light L3 that propagate at different angles with respect to a direction in which the first combined light CL1 enters the beam displacer 130D.

According to an example embodiment, the first light L1, the second light L2, and the third light L3 may be output at different angles from one surface of the beam displacer 130D.

For example, the first light L1 may propagate in a direction having a first angle θ1 with respect to a virtual first straight line VL1, perpendicular to the one surface of the beam displacer 130D.

The second light L2 may propagate in a direction having a second angle θ2 with respect to the virtual first straight line VL1.

The third light L3 may propagate in a direction having the third angle θ3 with respect to the virtual first straight line VL1.

For example, the first angle θ1, the second angle θ2, and the third angle θ3 may have different values, but example embodiments are not limited thereto.

The semiconductor measuring device 100D may include a first lens 1011 and a second lens 1012 disposed between the beam displacer 130D and a second beam splitter 122. The semiconductor measuring device 100D may be understood as an example of the semiconductor measuring device 100 illustrated in FIG. 1A.

For example, the semiconductor measuring device 100D may include a first lens 1011 disposed adjacent to the beam displacer 130D. Also, the semiconductor measuring device 100D may include a second lens 1012 disposed between the first lens 1011 and the second beam splitter 122.

Each of the first lens 1011 and the second lens 1012 may have the form of a convex lens, but example embodiments are not limited thereto.

According to an example embodiment, the first light L1, the second light L2, and the third light L3 that have passed through the beam displacer 130D may pass through the first lens 1011 to propagate in parallel towards the second lens 1012.

According to an example embodiment, the first light L1, the second light L2, and the third light L3 that have passed through the beam displacer 130D may be focused or directed onto the first lens 1011.

The first light L1, the second light L2, and the third light L3 that have passed through the second lens 1012 may be focused or directed onto the second beam splitter 122. The second beam splitter 122 may transmit the incident first, second, and third lights L1, L2, and L3.

Accordingly, the first light L1, the second light L2, and the third light L3 that have passed through the second lens 1012 may be focused onto the camera 160 via the second beam splitter 122.

Referring to FIG. 10B, the first light L1, the second light L2, and the third light L3 may enter the camera 160 at different angles.

According to an example embodiment, the first light L1 may enter the one surface 161 of the camera 160 at a first angle θ1 with respect to a virtual second straight line VL2, perpendicular to the one surface 161 of the camera 160. The second light L2 may enter the one surface 161 of the camera 160 at a second angle θ2 with respect to a virtual second straight line VL2. The third light L3 may enter the one surface 161 of the camera 160 at a third angle θ3 with respect to a virtual third straight line VL3, perpendicular to the one surface 161 of the camera 160.

The reflected light RL may be reflected by the second beam splitter 122. For example, the reflected light RL may be reflected by the second beam splitter 122 and enter the one surface 161 of the camera 160.

According to an example embodiment, the first light L1, the second light L2, the third light L3, and the reflected light RL, respectively entering the one surface 161 of the camera 160 at different angles, may form the plurality of interference patterns through the one surface 161 of the camera 160.

Furthermore, the computing device 170 may obtain height information of each point constituting the first surface 21 of the measurement object 20, based on the plurality of interference patterns.

Referring to the above-described configurations, the semiconductor measuring device 100D may obtain height information of each point of the measurement object 20 using the plurality of lights L1, L2, and L3 entering the camera 160 at different angles.

Thus, the semiconductor measuring device 100D may improve a measurement range of height information of each point of the measurement object 20.

In addition, referring to the above-described configurations, the semiconductor measuring device 100D may obtain height information of each point of the measurement object 20 using the plurality of lights L1, L2, and L3 passing through the same optical path.

Thus, the semiconductor measuring device 100D may significantly reduce an effect of vibrations, occurring in the optical path of the plurality of lights L1, L2, and L3, on the measurement results.

As a result, the semiconductor measuring device 100D may improve the stability in measuring height information of the measurement object 20.

In addition, referring to the above-described configurations, the semiconductor measuring device 100D may include the beam displacer 130D to be implemented with a relatively simple or less complex configuration, compared to the case in which distinct optical paths are formed in the plurality of lights L1, L2, and L3, respectively.

Thus, the semiconductor measuring device 100D may have a relatively small size.

As described above, the semiconductor measuring device 100 according to example embodiments may obtain height information of each point of the first surface 21 of the measurement object 20 using the plurality of lights L1 and L2, respectively entering the camera 160 at different angles.

Thus, the semiconductor measuring device 100 may increase a measurement range of height information of each point of the measurement object 20.

In addition, referring to the above-described configurations, the semiconductor measuring device 100 may obtain height information of each point of the measurement object 20 using the plurality of lights L1 and L2 passing through the same optical element (for example, the first beam splitter 121, the beam displacer 130, or the second beam splitter 122).

Thus, the semiconductor measuring device 100 may significantly reduce an effect of vibrations, occurring in the optical path of the plurality of lights L1 and L2, on the measurement results.

As a result, the semiconductor measuring device 100 may improve the stability and accuracy in measuring height information on the measurement object 20.

In addition, referring to the above-described configurations, the semiconductor measuring device 100 according to an example embodiment may obtain height information of each point of the measurement object 20 using the plurality of lights L1 and L2 output from different light sources 111 and 112.

Thus, the semiconductor measuring device 100 may improve the speed of measuring height information of the measurement object 20.

In addition, referring to the above-described configurations, the semiconductor measuring device 100 may include the beam displacer 130 to be implemented with a relatively simple or less complex configuration, compared to the case in which distinct optical paths are formed in the plurality of lights L1 and L2, respectively.

As a result, the semiconductor measuring device 100 may have a relatively small size.

As set forth above, a semiconductor measuring device according to example embodiments may improve the accuracy and stability of measurement using a beam displacer that separates a plurality of lights having different optical characteristics.

The operations performed by the computing device 170 as described herein may be implemented by computer program instructions and/or hardware operations. The computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the block diagram block or blocks. The computer program instructions may also be stored in a non-transitory computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

While example embodiments have been shown and described above, it will be apparent to those skilled in the art that modifications and variations could be made without departing from the scope of the present inventive concept as defined by the appended claims.

What is claimed is:

1. A semiconductor measuring device comprising:

a first light source configured to output first light having a first wavelength;

a second light source configured to output second light having a second wavelength that is different from the first wavelength;

a first beam splitter configured to generate first combined light and second combined light, each comprising the first light and the second light;

a beam displacer configured to separate the first combined light into the first light and the second light;

a camera configured to obtain a first interference pattern and a second interference pattern, the first interference pattern being based on the first light and a reflected light of the second combined light reflected from a first surface of a measurement object, and the second interference pattern being based on the second light and the reflected light; and a computing device configured to compute first height information of a first point included in the first surface based on the first interference pattern and the second interference pattern, wherein the beam displacer comprises a glass layer that is configured to transmit incident light, wherein the glass layer comprises a first surface including a plurality of protrusion patterns, and a second surface that is opposite the first surface, and at least a portion of the plurality of protrusion patterns is configured to refract the first combined light into the first light and the second light, each propagating through the glass layer in different directions.

2. The semiconductor measuring device of claim 1, further comprising:

a second beam splitter configured to transmit or reflect at least a portion of the reflected light, the first light, and the second light, wherein the first light and the second light are directed to the camera at different angles.

3. The semiconductor measuring device of claim 2, further comprising:

a first lens and a second lens between the beam displacer and the second beam splitter, wherein the first lens is configured to receive the first light and the second light from the beam displacer and output the first light and the second light in parallel, and wherein the second lens is configured to receive the first light and the second light from the first lens and direct the first light and the second light to the second beam splitter.

4. The semiconductor measuring device of claim 2, wherein:

the first beam splitter is configured to separate the first combined light and the second combined light such that the first combined light propagates along a first optical path and the second combined light propagates along a second optical path that is different from the first optical path, the beam displacer is configured to receive the first combined light through the first optical path, and the second combined light is directed to the measurement object through the second optical path.

5. The semiconductor measuring device of claim 2, further comprising:

a microscope configured to receive the second combined light output from the first beam splitter, wherein:

the microscope comprises:

an objective lens configured to direct the second combined light to the first surface of the measurement object; and a tube lens configured to direct the reflected light to the second beam splitter.

6. The semiconductor measuring device of claim 1, wherein:

the computing device is configured to:

overlap the first interference pattern and the second interference pattern to generate a combined image;

obtain first phase information of the first point corresponding to the first wavelength and second phase information of the first point corresponding to the second wavelength based on the combined image; and obtain the first height information based on the first phase information and the second phase information.

7. The semiconductor measuring device of claim 6, wherein:

the computing device is configured to:

perform a Fourier transform on the combined image to generate a first phase image corresponding to the first wavelength and a second phase image corresponding to the second wavelength; and obtain the first height information based on the first phase information included in the first phase image and the second phase information included in the second phase image.

8. The semiconductor measuring device of claim 1, wherein:

the measurement object comprises a semiconductor wafer, and at least one integrated circuit and interconnection are on a second surface of the measurement object that is parallel to the first surface.

9. The semiconductor measuring device of claim 1, wherein:

the first height information comprises a height value from a virtual reference plane comprising a single point on the first surface to the first point.

10. A semiconductor measuring device comprising:

a first light source configured to output first light having a first polarization component;

a second light source configured to output second light having a second polarization component that is different from the first polarization component;

a first beam splitter configured to output first combined light and second combined light, each comprising the first light and the second light;

a beam displacer configured to receive the first combined light and separate the first combined light into the first light and the second light;

a camera configured to obtain a first interference pattern and a second interference pattern, the first interference pattern being based on the first light and a reflected light of the second combined light reflected from a first surface of a measurement object, and the second interference pattern being based on the second light and the reflected light; and a computing device configured to compute first height information of a first point included in the first surface based on the first interference pattern and the second interference pattern, wherein:

the beam displacer comprises a glass layer that is configured to transmit incident light, wherein the glass layer comprises a first surface including a plurality of protrusion patterns, and a second surface that is opposite the first surface, and at least a portion of the plurality of protrusion patterns is configured to refract the first combined light into the first light and the second light, each propagating through the glass layer in different directions.

11. The semiconductor measuring device of claim 10, further comprising:

a second beam splitter configured to transmit or reflect at least a portion of the reflected light, the first light, and the second light, wherein the first light and the second light output from the second beam splitter are directed to the camera at different angles.

12. The semiconductor measuring device of claim 11, wherein:

the beam displacer comprises a first Savart plate and a second Savart plate, each configured to refract incident light based on a polarization component of each of the first and second Savart plates, and the beam displacer is configured to output the first light and the second light in parallel.

13. The semiconductor measuring device of claim 12, further comprising:

a first lens between the beam displacer and the second beam splitter, wherein the first lens is configured to receive the first light and the second light from the beam displacer and direct the first light and the second light to the second beam splitter.

14. The semiconductor measuring device of claim 10, wherein:

the computing device is configured to:

overlap the first interference pattern and the second interference pattern to generate a combined image;

obtain first phase information of the first point corresponding to the first polarization component and second phase information of the first point corresponding to the second polarization component based on the combined image; and obtain the first height information based on the first phase information and the second phase information.

15. A semiconductor measuring device comprising:

a first light source configured to output first light having a first optical characteristic;

a second light source configured to output second light having a second optical characteristic;

a first beam splitter configured to generate first combined light and second combined light, each comprising the first light and the second light;

a beam displacer configured to receive the first combined light and separate the first combined light into the first light and the second light based on the first optical characteristic and the second optical characteristic;

a camera configured to obtain a first interference pattern and a second interference pattern, the first interference pattern being based on the first light and a reflected light of the second combined light reflected from a first surface of a measurement object, and the second interference pattern being based on the second light and the reflected light; and a computing device configured to compute first height information of a first point included in the first surface based on the first interference pattern and the second interference pattern, wherein:

the beam displacer comprises a glass layer that is configured to transmit incident light, wherein the glass layer comprises a first surface including a plurality of protrusion patterns, and a second surface that is opposite the first surface, and at least a portion of the plurality of protrusion patterns is configured to refract the first combined light into the first light and the second light, each propagating through the glass layer in different directions.

16. The semiconductor measuring device of claim 15, further comprising:

a second beam splitter configured to transmit or reflect at least a portion of the reflected light, the first light, and the second light, wherein the first light and the second light output from the second beam splitter are directed to the camera at different angles.

17. The semiconductor measuring device of claim 16, wherein:

the beam displacer is configured to separate the first light having a first wavelength and the second light having a second wavelength that is different from the first wavelength such that the first light and the second light propagate in different directions based on the first wavelength and the second wavelength, respectively.

18. The semiconductor measuring device of claim 16, wherein:

the beam displacer is configured to separate the first light having a first coherence length and the second light having a second coherence length that is different from the first coherence length based on the first coherence length and the second coherence length, respectively.

19. The semiconductor measuring device of claim 16, comprising:

at least one lens between the beam displacer and the second beam splitter, wherein the second beam splitter is configured to direct the reflected light to a surface of the camera, and the at least one lens is configured to direct the first light and the second light to the surface of the camera at different angles.

* * * * *